US012768329B2

(12) United States Patent
Kapsenberg et al.

(10) Patent No.: US 12,768,329 B2
(45) Date of Patent: Oct. 20, 2026

(54) LATERAL CAVITY APERTURE FOR WAVE ENERGY CONVERTER

(71) Applicant: Lone Gull Holdings, Ltd., Portland, OR (US)

(72) Inventors: Florian Kapsenberg, Portland, OR (US); Garth Alexander Sheldon-Coulson, Portland, OR (US); Brian Lee Moffat, Portland, OR (US); Grzegorz Piotr Filip, Portland, OR (US)

(73) Assignee: Lone Gull Holdings, Ltd., Portland, OR (US)

( * ) Notice: Subject to any disclaimer, the term of this patent is extended or adjusted under 35 U.S.C. 154(b) by 0 days.

(21) Appl. No.: 19/364,919

(22) Filed: Oct. 21, 2025

(65) Prior Publication Data

US 2026/0117737 A1 Apr. 30, 2026

Related U.S. Application Data

(60) Provisional application No. 63/866,140, filed on Aug. 18, 2025, provisional application No. 63/754,458, filed on Feb. 5, 2025, provisional application No. 63/714,067, filed on Oct. 30, 2024.

(51) Int. Cl.

*F03B 13/22* (2006.01)
*F03B 11/02* (2006.01)
*F03B 13/14* (2006.01)

(52) U.S. Cl.

CPC .............. *F03B 13/22* (2013.01); *F03B 11/02* (2013.01); *F03B 13/148* (2013.01)

(58) Field of Classification Search

CPC ........ F03B 13/22; F03B 11/02; F03B 13/148; F03B 13/00

See application file for complete search history.

(56) References Cited

U.S. PATENT DOCUMENTS 4,480,966 A 11/1984 Smith et al.
5,136,173 A 8/1992 Rynne
10,605,226 B2 * 3/2020 Sheldon-Coulson ........................ F03B 13/145

(Continued)

FOREIGN PATENT DOCUMENTS

WO 2024031156 A1 2/2024

OTHER PUBLICATIONS

International Search Report and Written Opinion from PCT/US2025/052138 dated Dec. 29, 2025, 12 pgs.

(Continued)

*Primary Examiner* — Anthony D Wiest

(74) *Attorney, Agent, or Firm* — Schwabe, Williamson & Wyatt, P.C.

(57) ABSTRACT

Embodiments disclosed herein include a vessel that configured to float at a surface of a body of water. In an embodiment, the vessel comprises a buoy that is configured to float at the surface of the body of water, and a tube coupled to the buoy, where the tube extends down into the body of water. In an embodiment, the vessel further comprises a cavity at an end of the tube opposite from the buoy, where the cavity comprises an aperture that is at least partially along a plane that is non-orthogonal to a longitudinal axis of the tube, and where a bottom surface of the cavity comprises a tangent that is up to 20° from being orthogonal to the longitudinal axis of the tube.

30 Claims, 30 Drawing Sheets

(56) References Cited

U.S. PATENT DOCUMENTS

| | | | | |
|---|---|---|---|---|
| 12,195,142 | B2 * | 1/2025 | Sheldon-Coulson | ........................ F03B 13/142 |
| 12,497,702 | B2 * | 12/2025 | Sheldon-Coulson | ..... C25B 9/65 |
| 2019/0353139 | A1 | 11/2019 | Sheldon-Coulson et al. | |
| 2020/0056578 | A1 | 2/2020 | Sheldon-Coulson et al. | |
| 2020/0182218 | A1 | 6/2020 | Sheldon-Coulson et al. | |
| 2022/0213862 | A1 | 7/2022 | Sheldon-Coulson et al. | |
| 2023/0323849 | A1 | 10/2023 | Denniss | |
| 2024/0158057 | A1 | 5/2024 | Filip et al. | |
| 2024/0240604 | A1 | 7/2024 | Sheldon-Coulson et al. | |

OTHER PUBLICATIONS

Examination Report No. 1 from Australian Patent Application No. 2024219657 (Change of Agent Summary Lot 2) dated Aug. 7, 2025, 5 pgs.

* cited by examiner

LATERAL CAVITY APERTURE FOR WAVE ENERGY CONVERTER

CROSS-REFERENCE TO RELATED APPLICATIONS

This application claims the benefit of U.S. Provisional Application No. 63/714,067, filed on Oct. 30, 2024, the entire contents of which are hereby incorporated by reference herein.

This application claims the benefit of U.S. Provisional Application No. 63/754,458, filed on Feb. 5, 2025, the entire contents of which are hereby incorporated by reference herein.

This application claims the benefit of U.S. Provisional Application No. 63/866,140, filed on Aug. 18, 2025, the entire contents of which are hereby incorporated by reference herein.

BACKGROUND

There are many applications that require the utilization and/or operation of an apparatus that nominally floats adjacent to an upper surface of a body of water over which waves tend to pass. Many of these devices are equipped with a propulsion system that generates propulsion through its consumption of converted or stored energy resources (e.g. batteries, hydrogen gas, diesel fuel, etc.). The missions that these devices complete before exhausting their onboard stored energy resources are typically of a relatively short duration. However, there are consequences and/or risks to these devices should they exhaust their energy and lose the ability to propel themselves.

Other mechanisms that are able to harness ambient environmental fluid movements such as waves and/or wind (e.g., through the use of flaps and/or rotatable rigid sails), enable vessels to generate propulsive forces sufficient to propel those vessels. However, such mechanisms comprise moving parts. Moving parts provide potential points of failure. Devices that use such moving-part mechanisms to propel themselves, especially those that operate far from land, tend to be at risk of failure at least in part because of the risk that the moving parts on which they depend for propulsion will wear out, become damaged, and/or otherwise fail.

SUMMARY OF THE INVENTION

Disclosed herein is a vessel configured to float at a surface of a body of water. In an embodiment, the vessel comprises a buoy that is configured to float at the surface of the body of water, and a tube coupled to the buoy, where the tube extends down into the body of water. In an embodiment, the vessel further includes a cavity at an end of the tube opposite from the buoy, where the cavity comprises an aperture that is at least partially along a plane that is non-orthogonal to a longitudinal axis of the tube. In an embodiment, a width of the aperture is greater than a narrowest outer width of the tube. Further, a bottom surface of the cavity comprises a tangent that is up to 20° from being orthogonal to the longitudinal axis of the tube. For example, the tangent may be up to 15° from being orthogonal to the longitudinal axis of the tube, up to 10° from being orthogonal to the longitudinal axis of the tube, or up to 5° from being orthogonal to the longitudinal axis of the tube. Though, in other embodiments, the tangent may be up to 30° from being orthogonal to the longitudinal axis of the tube, or up to 45° from orthogonal from being orthogonal to the longitudinal axis of the tube In an embodiment, oscillation of the vessel in response to wave motion in a body of water may provide a propulsive force to the vessel in a direction opposing an orientation of the aperture of the cavity. The oscillating water within the partially confined volume of the cavity produces an unbalanced force against an inner surface of the cavity that is in a direction away from a normal of the plane (or planes) of the aperture. The propulsive force may allow for the vessel to traverse the body of water. Accordingly, vessels in accordance with embodiments described herein do not risk the exhaustion of energy stores and can perpetually propel themselves through the body of water. Further, the lateral aperture structure of the cavity includes no moving parts. As such, potential points of failure are avoided and maintenance requirements for the vessel are reduced. This allows for longer mission durations, which may be particularly beneficial for some applications, such as energy harvesting processes used to generate one or more energy products.

DETAILED DESCRIPTIONS OF THE PREFERRED EMBODIMENTS

Figure 1:
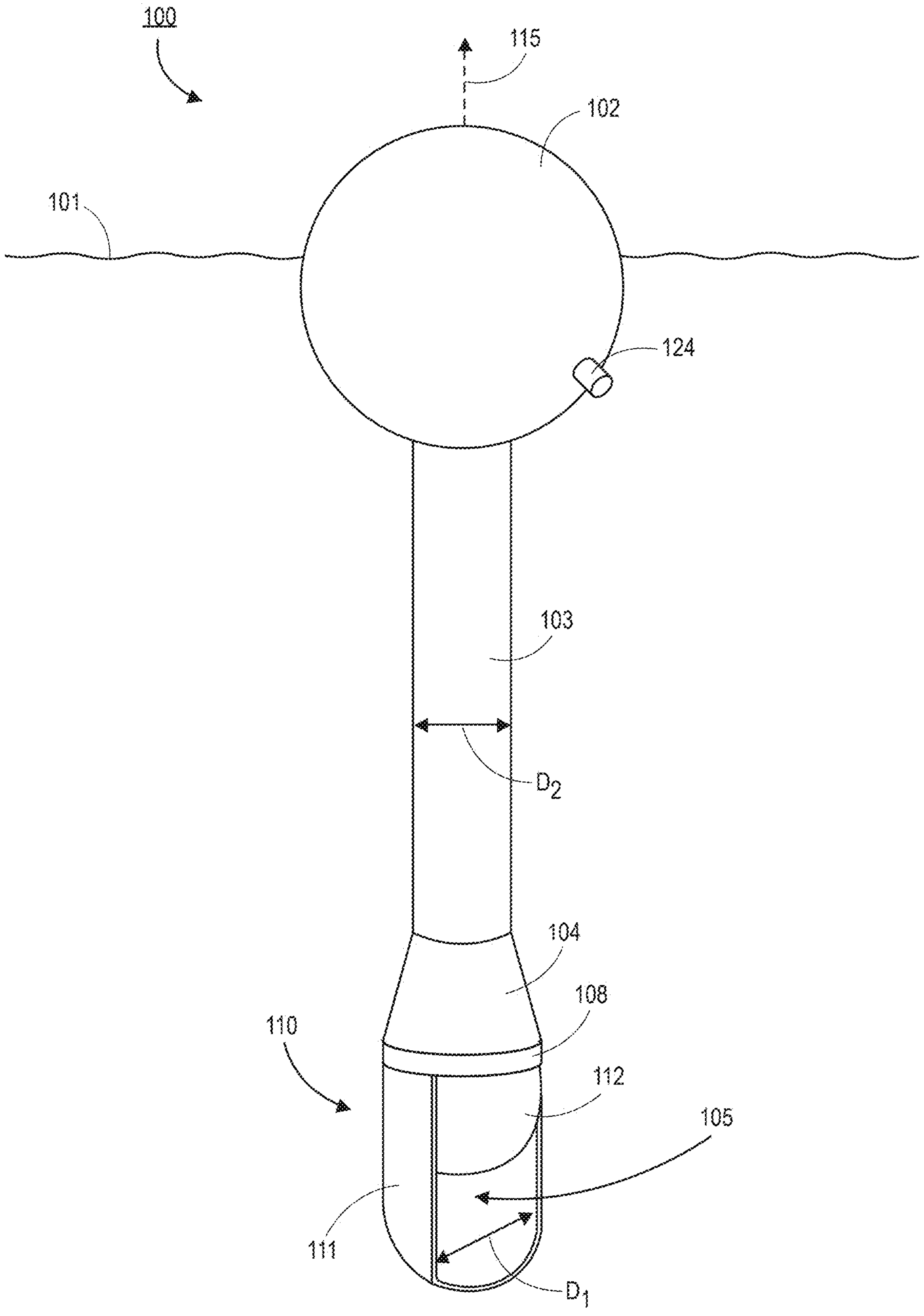
FIG. 1 is a perspective view illustration of a vessel that comprises a cavity with a lateral aperture at a bottom end of the vessel, in accordance with an embodiment.

For a fuller understanding of the nature and objects of the disclosure, reference should be made to the following detailed description, taken in connection with the accompanying drawings. The following figures, and the illustrations offered therein, in no way constitute limitations, either explicit or implicit, on the scope of the current disclosure. Various embodiments or aspects of the disclosure are described herein. In some implementations, the different embodiments are practiced separately. However, embodiments are not limited to embodiments being practiced in isolation. For example, two or more different embodiments can be combined together in order to be practiced as a single device, process, structure, or the like. The entirety of various embodiments can be combined together in some instances. In other instances, portions of a first embodiment can be combined with portions of one or more different embodiments. For example, a portion of a first embodiment can be combined with a portion of a second embodiment, or a portion of a first embodiment can be combined with a portion of a second embodiment and a portion of a third embodiment.

The embodiments illustrated and discussed in relation to the figures included herein are provided for the purpose of explaining some of the basic principles of the disclosure. However, the scope of this disclosure covers all related, potential, and/or possible, embodiments, even those differing from the idealized and/or illustrative examples presented. This disclosure covers even those embodiments which incorporate and/or utilize modern, future, and/or as of the time of this writing unknown, components, devices, systems, etc., as replacements for the functionally equivalent, analogous, and/or similar, components, devices, systems, etc., used in the embodiments illustrated and/or discussed herein for the purpose of explanation, illustration, and example.

The scope of this disclosure includes embodiments possessing, incorporating, including, and/or utilizing, any number of vessels that comprise a cavity with a lateral aperture. The scope of this disclosure includes embodiments possessing, incorporating, including, and/or utilizing, vessels made of any and all materials. The scope of this disclosure includes vessels that include a cavity with a lateral aperture that has a width that is wider than a narrowest width of an external tube that couples the cavity to a buoy that floats at a surface of a body of water. In some embodiments, oscillation of the vessel in the body of water may result in the generation of an unbalanced force against an interior surface of the cavity that provides a propulsive force for the vessel. Accordingly, the vessel may be propelled through environmental forces (e.g., wave energy) without the need for moving parts. This improves reliability of the vessel over long durations and avoids issues relating to exhausting a stored energy source that would otherwise be needed to propel the vessel.

The scope of this disclosure includes embodiments possessing, incorporating, including, and/or utilizing, vessels that include wave-motion energized power take offs, including, but not limited to: fluid and/or hydrokinetic turbines of any and all types, any and all diameters, any and all efficiencies, any and all power ratings, and made of any and all materials; magnetohydrodynamic generators of any and all types, any and all diameters, any and all efficiencies, any and all power ratings, and made of any and all materials; hydraulic pumps, accumulators, and/or generators, of any and all types, any and all diameters, any and all efficiencies, any and all power ratings, and made of any and all materials; pendulum mechanisms, and/or mechanisms possessing, incorporating, including, and/or utilizing, unbalanced and/or off-axis weights, of any and all types, any and all diameters, any and all efficiencies, any and all power ratings, and made of any and all materials; electrical generators and/or alternators of any and all types, any and all diameters, any and all efficiencies, any and all power ratings, and made of any and all materials; and/or energy conversion mechanisms, systems, and/or apparatuses, of any and all types, any and all diameters, any and all efficiencies, any and all power ratings, and made of any and all materials. Vessels that include any such wave-motion energized systems may generally be referred to as a wave energy converter (WEC).

A portion of many embodiments of the present disclosure include, incorporate, and/or utilize, at least one buoyant portion, buoy, vessel, and/or module. These buoyant portions may be referred to as hollow flotation modules, buoys, buoyant capsules, buoyant chambers, buoyant compartments, buoyant enclosures, buoyant vessels, chambers, hollow balls, and/or hollow spheroids. Many terms, names, descriptors, and/or labels, could adequately distinguish an embodiment's buoyant portion from among its other components, features, and/or elements, and the scope of the present disclosure incorporates any naming convention and/or choice, and is not limited by the nomenclature used to describe an embodiment or its parts. The scope of this disclosure includes embodiments possessing, incorporating, including, and/or utilizing, any number of fluid chambers, and fluid chambers of any design, size, shape, volume, relative and/or absolute position within an embodiment. The scope of this disclosure includes embodiments possessing, incorporating, including, and/or utilizing, fluid chambers made of any and all materials.

Referring now to FIG. 1, a side perspective view of a vessel 100 is shown, in accordance with an embodiment: the vessel 100 may float on a body of water 101. For example, a buoyant chamber 102 may be provided along a surface of the body of water 101. The buoyant chamber 102 may be coupled to a tube 103 that extends down from the buoyant chamber 102 into the body of water 101. The tube 103 has an aperture 105 at the bottom to allow water to enter the tube 103. In some embodiments, the vessel 100 may include buoyant chamber 102 with a diameter that is approximately 20 meters or smaller, approximately, 10 meters or smaller, or approximately 1 meter or smaller. Though, larger diameters may also be used. A length of the tube 103 may be approximately 100 meters or less, approximately 50 meters or less, approximately 20 meters or less, or approximately 1 meter or less. Though, larger lengths may also be used in some embodiments. More generally, a length of the tube 103 may be related to a diameter of the buoyant chamber 102 by a ratio of (tube length:chamber diameter) that is 0.5:1 or greater, 1:1 or greater, 2:1 or greater, 5:1 or greater, or 10:1 or greater. Though, smaller ratios may also be used in some embodiments.

During oscillation (i.e., rising and falling) of the vessel 100 in response to waves passing through and/or over the body of water 101, water in the tube 103 may be injected into the buoyant chamber 102. As will be described in greater detail below, the oscillation of the vessel 100 and resulting injection of water into the buoyant chamber 102 may generate a pressure difference within the vessel 100 (or between the interior of the vessel 100 and the external environment) that drives water (or other fluid) through a turbine (not visible in FIG. 1) within an effluent pipe 124 that fluidically couples an interior of the buoyant chamber 102 to the body of water 101. The turbine can be coupled to a generator (not visible in FIG. 1) that converts rotational energy into electrical power. In some embodiments, the electrical power is used to generate an energy product (e.g., hydrogen gas generation through an electrolysis process) that is stored on the vessel 100 or on a chamber coupled to the vessel 100. In an embodiment, the energy product may be removed from the vessel 100 at various intervals. In an embodiment, the electrical power is used to power a cluster of computers onboard the vessel. During the offloading of the energy product, one or more precursors for the generation of the energy product may also be loaded onto the vessel 100.

In an embodiment, the vessel 100 may comprise a cavity 110 at an end of the tube 103 opposite from the buoyant chamber 102. The cavity 110 may be coupled to the tube 103 by a constriction 104. In an embodiment, a cuff 108 may also be provided between the cavity 110 and the constriction 104. The constriction 104 may be a hollow frustoconical shape that allows for the cavity 110 to have a width that is wider than a narrowest outer width of the tube 103. Though, in some embodiments, the constriction 104 may be considered as being part of the tube 103 or as part of the cavity 110. In other embodiments, the cavity 110 may be directly coupled to the tube 103 and the constriction 104 and/or cuff 108 may be omitted. More generally, the aperture 105 of the cavity may have a first width $D_1$ that is greater than a narrowest width of the tube 103 (i.e., a second width $D_2$). In an embodiment, the aperture 105 may be referred to as being "laterally oriented". As used herein, a "laterally oriented" aperture 105 may be an aperture that is within one or more planes that are non-orthogonal to a longitudinal axis 115 of the vessel 100. For example, In FIG. 1, the aperture 105 is substantially parallel to the longitudinal axis 115 of the vessel 100. In the event that an aperture 105 has a curving edge or rim, said aperture 105 may be laterally oriented when a portion of said edge or rim is tangent to a plane that is non-orthogonal to a longitudinal axis 115 of the vessel 100.

In an embodiment, a fluidic path may be provided from the aperture 105, into the cavity 110, into the tube 103, and into the buoyant chamber 102. That is, fluid from the body of water outside of the vessel 100 may flow through an internal passage of the vessel 100 from the aperture 105 to the buoyant chamber 102. In some embodiments, a constriction may be provided along the fluidic path. The constriction may be provided along the tube 103 in some embodiments.

In an embodiment, oscillation of the vessel 100 in response to wave motion in the body of water 101 may provide a propulsive force to the vessel 100 in a direction opposing an orientation of the aperture 105 of the cavity 110. The oscillating water within the partially confined volume of the cavity 110 produces an unbalanced force against an inner surface of the cavity 110 that is in a direction away from a normal of the plane (or planes) of the aperture 105. In an embodiment, a bottom surface of the cavity moving up and down applies force on water in the partially confined volume of the cavity 110. When the bottom surface comprises a tangent that is up to 20° from being orthogonal to the longitudinal axis of the tube the water within the cavity is force to move outwards substantially radially from the longitudinal axis of the tube.

Since the only opening is the aperture 105, substantially all of the radial expulsion of water is directed out of the aperture to provide a propulsive force to the vessel 100. The propulsive force may allow for the vessel to traverse the body of water 101. In some instances, a navigation control system (e.g., rudder, fin, etc.) may be used to control the direction of the vessel 100 as it is propelled. In other instances, the cavity 110 may be rotatable (e.g., at the constriction 104) in order to provide controlled navigation of the vessel 100.

In the illustrated embodiment, the cavity 110 may comprise a first shell 111 and a second shell 112. The second shell 112 may cover a portion of the aperture 105 of the first shell 111. In an embodiment, the second shell 112 may be a partial sphere-like shape that opens into the first shell 111. For example, a lower portion of the second shell 112 may have a spherical like outer surface. A more detailed illustration of the structure of the first shell 111 and the second shell 112 is described in greater detail herein. More generally, the combination of the first shell 111 and the second shell 112 may form a cavity 110 that is axially asymmetric about the longitudinal axis 115 of the vessel 100. Though, other embodiments disclosed herein may include cavities that are axisymmetric about the longitudinal axis 115. An edge, especially a lower edge, of the second shell 112 may be located inside the region defined by the vertical projection of the tube 103, such that it is directly underneath a portion of the hollow interior of the tube 103. In other words, the second shell 112 may intrude inwardly into the downward projection of the maximal circumference of tube 103. In an embodiment, an outer surface of the second shell 112 may remain within a vertical projection of the outer circumference of the cuff 108. Though, in some instances, a portion of the second shell 112 may extend out beyond the vertical projection of the outer circumference of the cuff 108.

As noted above the width $D_1$ of the aperture 105 may be wider than a narrowest width of the tube 103. Embodiments may also include an aperture 105 that has an area that is larger than a cross-sectional area of the tube 103 as measured through a plane that is normal to the longitudinal axis 115 of the vessel 100. In the illustrated embodiment, the aperture 105 is substantially parallel to the longitudinal axis 115.

Figure 2:
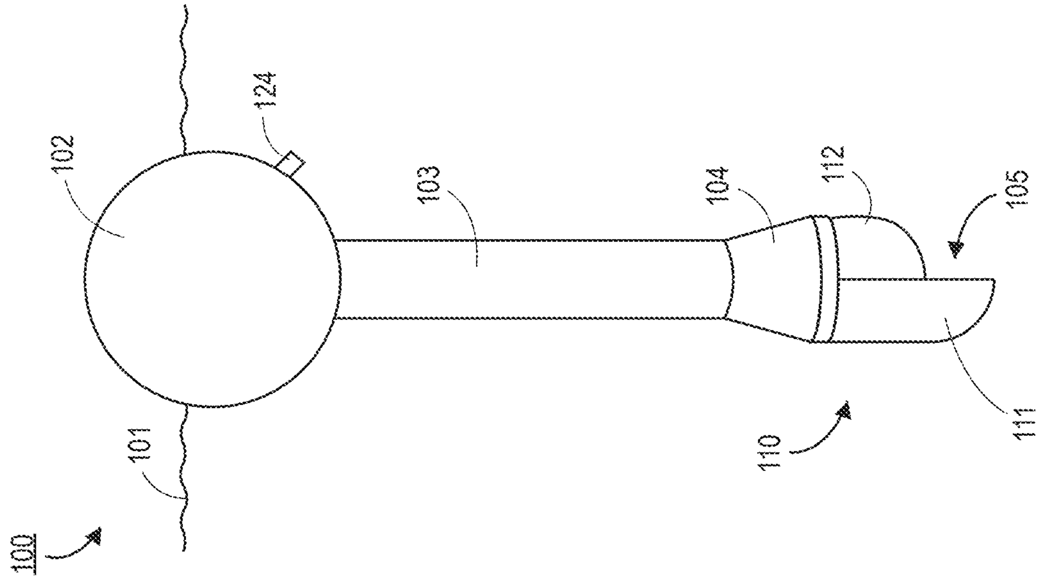
FIG. 2 is a side view illustration of the vessel in FIG. 1, in accordance with an embodiment.

FIG. 2 shows a side view of the same vessel 100 that is illustrated in FIG. 1. As shown, the cavity 110 may comprise a first shell 111 that includes a vertical sidewall with a curved bottom, and the second shell 112 may have a vertical portion that extends down from the edge of the constriction 104 and a lower profile that is a partial circle. The second shell 112 may extend out past an outermost edge of the constriction 104. Though, in other embodiments, the maximum width of the constriction 104 may be substantially equal to the maximum width of the cavity 110 (as shown in FIG. 2).

Figure 3:
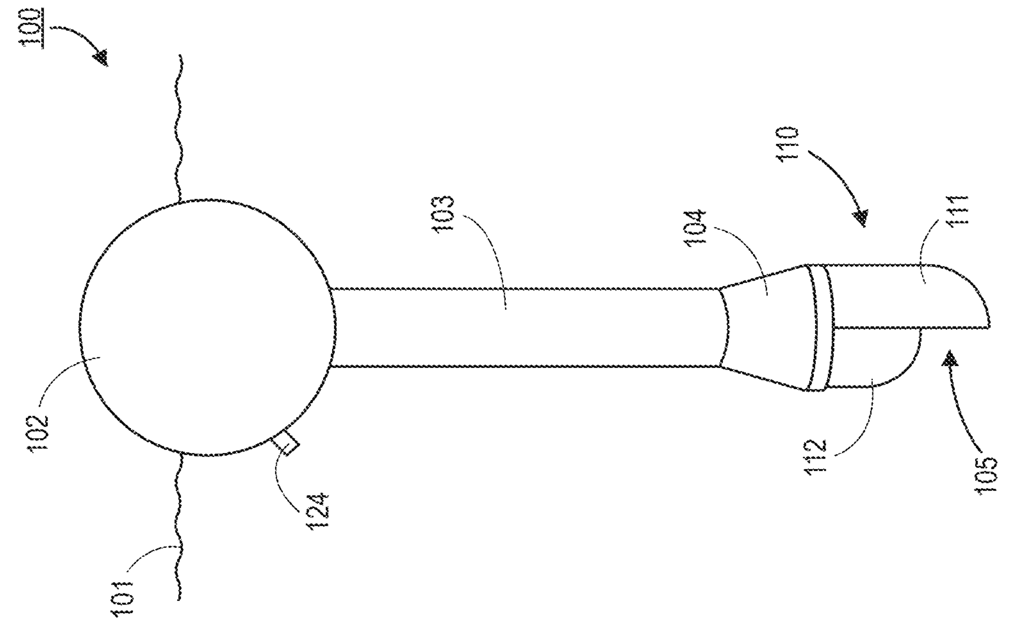
FIG. 3 is a side view illustration of the vessel in FIG. 1, in accordance with an embodiment.

FIG. 3 shows a second side view of the same vessel 100 that is illustrated in FIG. 1 and FIG. 2.

Figure 4:
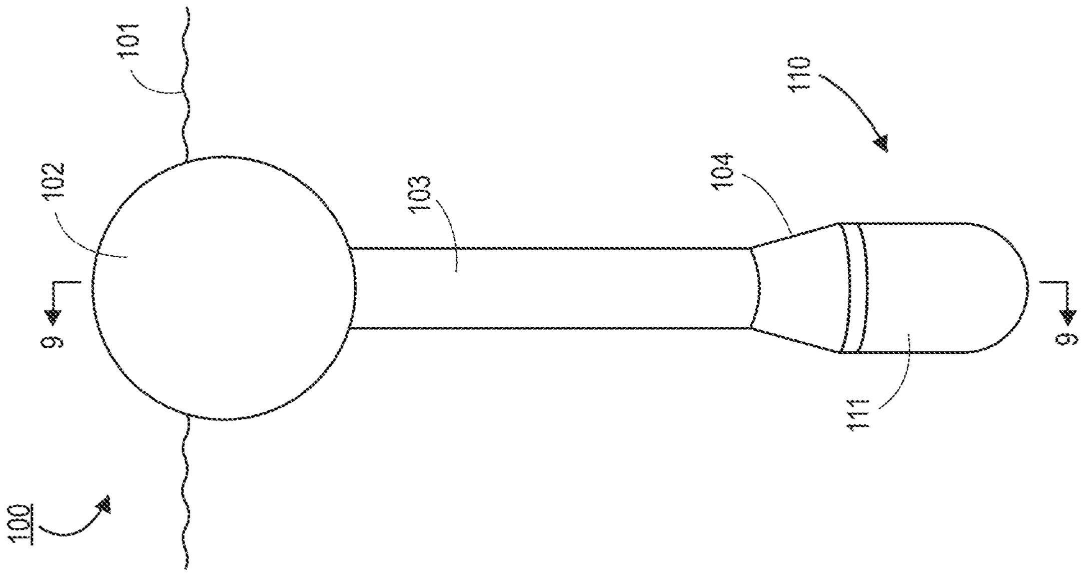
FIG. 4 is a front view illustration of the vessel in FIG. 1, in accordance with an embodiment.

FIG. 4 shows a side view of the same vessel 100 that is illustrated in FIGS. 1-3. The view shown in FIG. 4 is opposite from the aperture 105. As shown, the surface of the cavity 110 opposite from the aperture 105 may be a continuous surface of the first shell 111.

Figure 5:
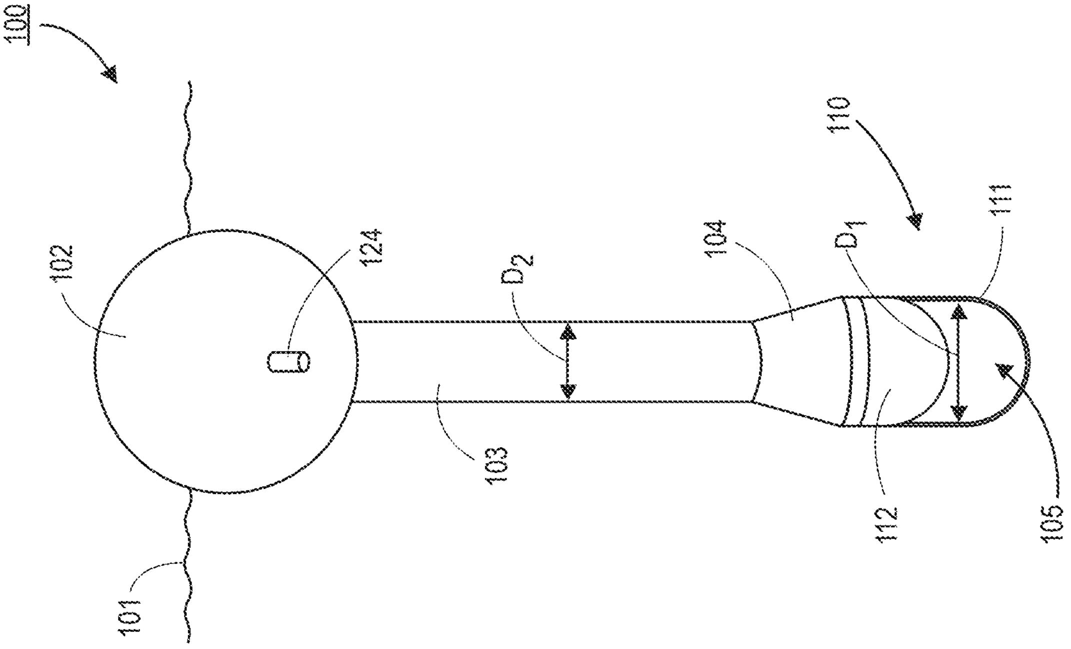
FIG. 5 is a back view illustration of the vessel in FIG. 1, in accordance with an embodiment.

FIG. 5 shows a side view of the same vessel 100 that is illustrated in FIGS. 1-4. The view shown in FIG. 5 illustrates the aperture 105. As shown, the aperture 105 may have vertical sidewalls with a curved top edge and a curved bottom edge. In some embodiments, the top edge and the bottom edge of the aperture 105 may both be curved in the same direction. The radius of curvature of the top edge and the radius of curvature of the bottom edge of the aperture 105 may be different, or the radius of curvature of the top edge and the radius of curvature of the bottom edge may be the same.

Figure 6:
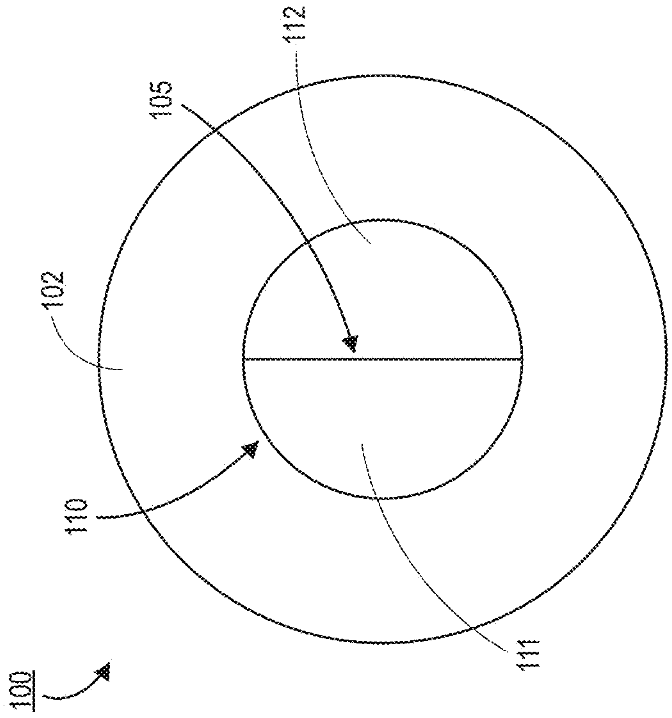
FIG. 6 is a bottom view illustration of the vessel in FIG. 1, in accordance with an embodiment.

FIG. 6 shows a bottom-up view of the same vessel 100 that is illustrated in FIGS. 1-5. The bottom-up view of the cavity 110 illustrates the second shell 112 being enclosed at the bottom. That is, an aperture of the second shell 112 may open into the first shell 112 above the aperture 105 of the first shell 112. In an embodiment, the aperture of the second shell 112 is in a plane that is substantially parallel to the aperture 105 of the first shell 111. Though, the plane of the aperture of the second shell 112 may be non-parallel to the aperture 105 in other embodiments (e.g., as shown in FIG. 8).

Figure 7:
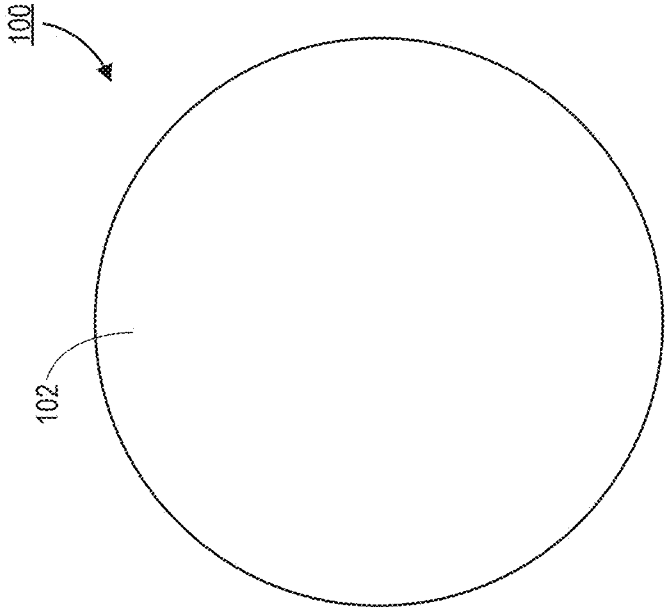
FIG. 7 is a top view illustration of the vessel in FIG. 1, in accordance with an embodiment.

FIG. 7 shows a top-down view of the same vessel that is illustrated in FIGS. 1-6.

Figure 8:
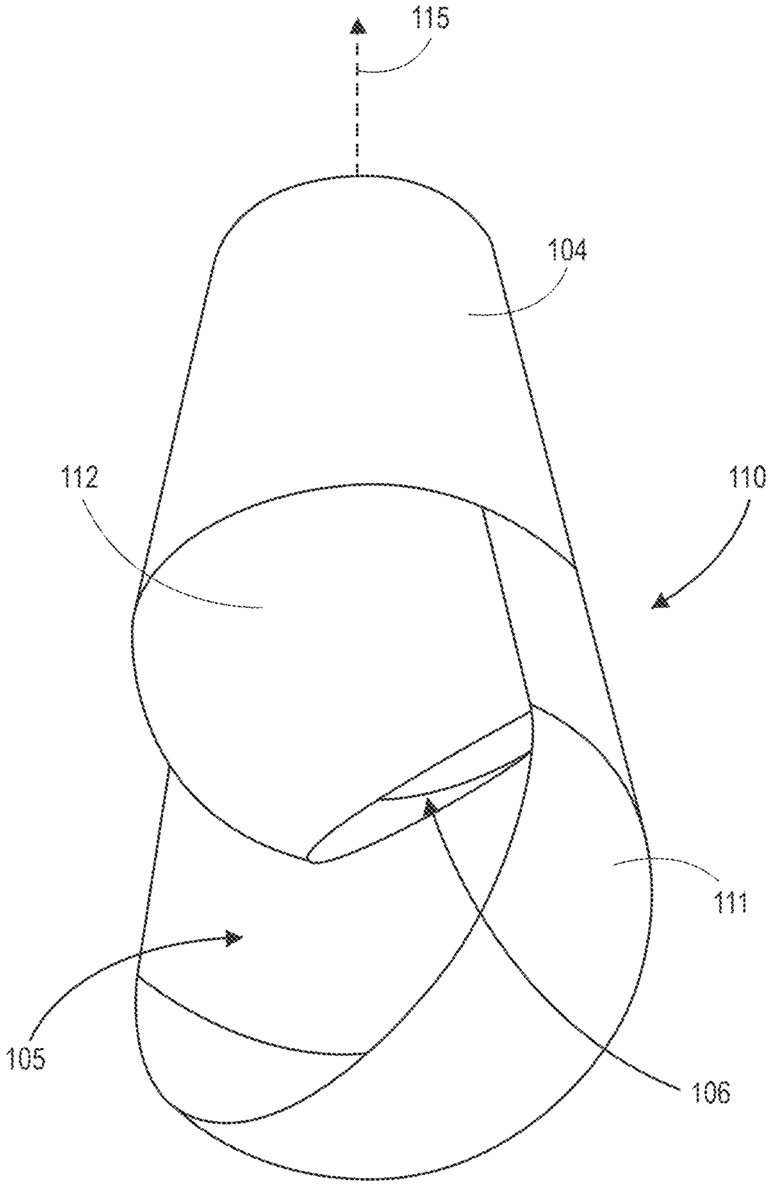
FIG. 8 is a perspective view illustration of the cavity with the lateral aperture of the vessel in FIG. 1, in accordance with an embodiment.

FIG. 8 is a zoomed in perspective view illustration of the cavity 110 of the vessel 100, in accordance with an embodiment. As shown, the cavity 110 is coupled to a lower end of the constriction 104. The upper end of the constriction 104 may be coupled the tube (not shown in FIG. 7). As shown, the planes of the aperture 105 of the first shell 111 intersects a plane of the aperture 106 of the second shell 112. The orientation of the plane of the aperture 105 of the first shell 111 to the plane of the aperture 106 of the second shell 112 may be used in order to control and/or optimize a propulsive force applied to the vessel 100. In an embodiment, an area of the aperture 105 of the first shell 111 may be larger than an area of the aperture 106 of the second shell 112. Though, in other embodiments, the apertures 105 and 106 may be similar in area. In an embodiment, the second shell 112 may be nested within the first shell 111.

Figure 9:
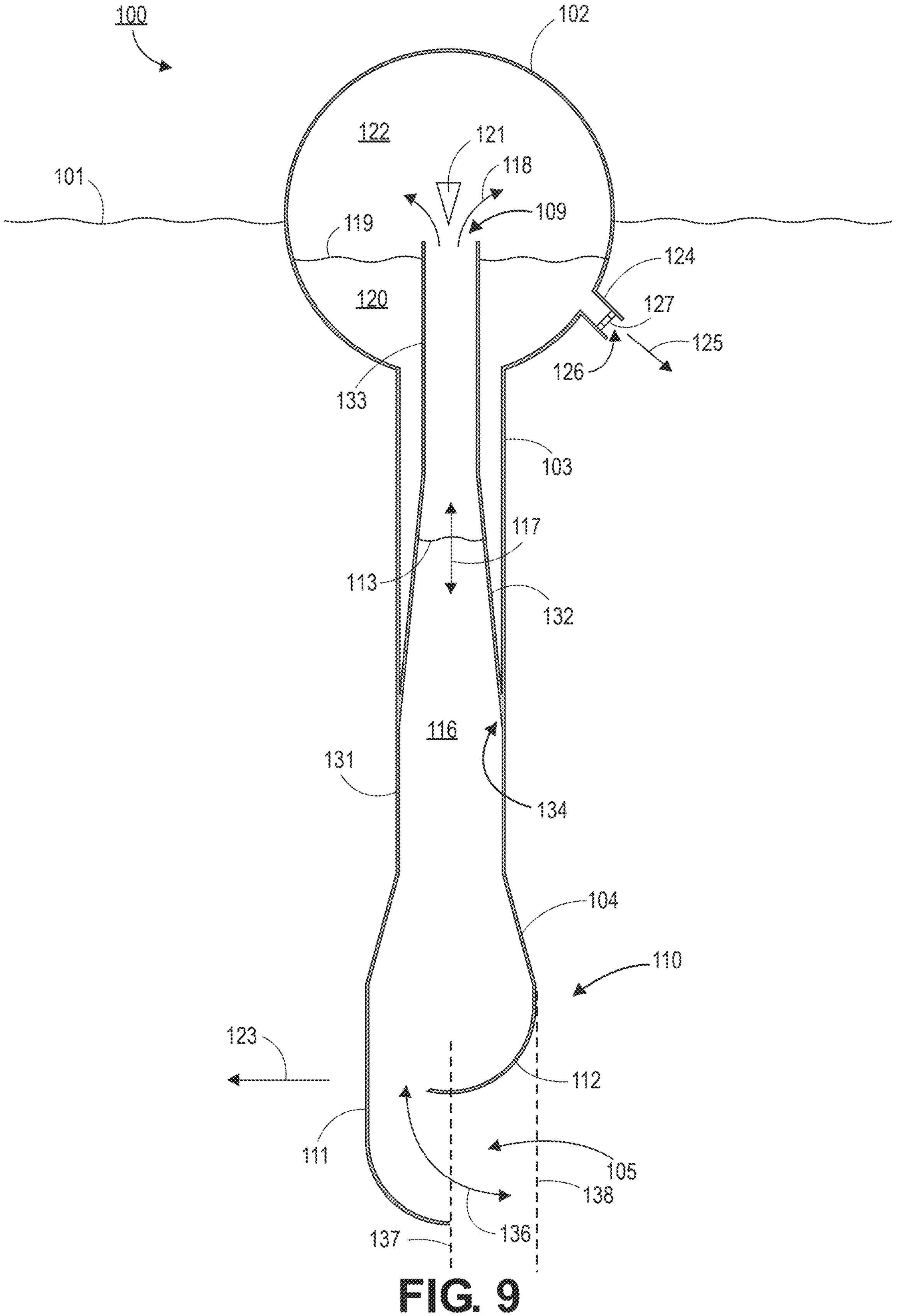
FIG. 9 is a cross-sectional illustration of the vessel in FIG. 1, in accordance with an embodiment.

FIG. 9 shows a cross sectional view of the same embodiment of the present disclosure that is illustrated in FIGS. 1-8, wherein the vertical section plane is specified in FIG. 4 and the section is taken across line 9-9: the vessel 100 has an approximately cylindrical outer tube 103. It also has an inner fluid channel and/or reaction tube comprised of three segments: a lower, approximately cylindrical portion 131; a medial, approximately frustoconical portion 132, and; an upper, approximately cylindrical portion 133. The reaction tube has an uppermost aperture 109 that is within a plane approximately normal to a longitudinal axis of the reaction tube. The reaction tube is fluidically coupled to the cavity 110 by a constriction 104. In an embodiment, an aperture 105 at an end of the cavity 110 opposite from the constriction 104 is laterally oriented so that the aperture 105 is along a plane that is not substantially normal to a longitudinal axis of the reaction tube. For example, the aperture 105 may be along a plane that is substantially parallel to the longitudinal axis of the reaction tube, within 15 degrees of being parallel to the longitudinal axis of the reaction tube, within 45 degrees of being parallel to the longitudinal axis of the reaction tube, within 65 degrees of being parallel to the longitudinal axis of the reaction tube, or within 85 degrees of being parallel to the longitudinal axis of the reaction tube. In an embodiment, the first shell 111 may have an end at the aperture 105 that extends to a centerline 137 of the vessel 100. Though, the end of the first shell 111 may stop before the centerline 137 and/or extend past the centerline 137 in other architectures. In an embodiment, the second shell 112 may remain within a vertical projection 138 of an outer edge of the constriction 104. The edge of the second shell 112 may extend to the centerline 137, extend past the centerline 137, or stop short of the centerline 137. In some embodiments, the a portion of the second shell 112 may overlap a portion of the first shell 111 when viewed in a cross-section similar to the one shown in FIG. 9. In an embodiment, the reaction tube 131-133, and the outer tube 103, share a common lower cylindrical portion, wall, and/or tube (i.e., the lower portion 131). The common portion 131 of the inner and outer tubes join the inner reaction tube 132 and the tube 103 at junction and/or seam 134.

As the vessel 100 illustrated in FIG. 9 moves up and down in response to wave motion, water 116 moves into and out of the aperture 105 (as indicated by the double-sided arrow 136) of the cavity 110. In a similar and/or related fashion, an upper surface 113 of the water 116 within the reaction tube 131-133 moves 117 up and down. As water within the upper portion 132-133 of the reaction tube moves up and down, its passage through, encounter with, and/or obstruction by the constricted frustoconical portion 132 of the reaction tube causes the water's movement to be accelerated. Occasionally water accelerated upward within the embodiment's reaction tube achieves sufficient upward momentum that a portion of that upwardly moving water is ejected 118 from the upper mouth 109 and/or aperture of the reaction tube 133 and thereafter falls onto an upper surface 119 of, merges with, and is thereby captured within, a reservoir 120 of water contained within a lower portion of the interior of the hollow buoy 102 of the vessel 100. Water ejected from the upper mouth 109 of the reaction tube is diverted laterally by an approximately conical diverter 121.

Above the upper surface 119 of the water reservoir 120 within the interior of the hollow buoy 102 is a pocket of pressurized air 122 that imparts pressure to the water within the water reservoir 120. The pressure from the pocket of pressurized air 122 pushes the resting and/or nominal level 113 of the water within the embodiment's reaction tube 131-133 to a depth below the resting and/or nominal level of the water 101 on that the vessel 100 floats.

Pressurized water in the water reservoir 120 within the hollow buoy 102 flows out of the buoy 102, and into the body of water 101, through an effluent pipe 124. A water turbine 127 positioned within the effluent pipe 124 is caused to rotate by the outflow of pressurized water 125 from the water reservoir 120 as it flows out the aperture 126 of the effluent pipe 124. A generator (not shown) operably connected to the water turbine 127 generates electrical power in response to rotations of the water turbine.

The presence of a partially confined cavity 110 defined by the first shell 111 and the second shell 112 generates a propulsive thrust 123 as the vessel 100 oscillates in the body of water 101. That is, the controlled flow of water 116 (as indicated by the arrow 136) results in the generation of an unbalanced force on the inner surface of the first shell 111 of the cavity 110. The resulting unbalanced force imparted to the inner surface of the first shell 111 opposite the lower aperture 105 creates a net force and/or propulsive thrust 123 in a "forward" direction that tends to propel the vessel 100 in a leftward direction ("leftward" with respect to the orientation of the embodiment illustrated in FIG. 9), i.e. the same direction as the arrow of the propulsive thrust 123.

An embodiment similar to the one illustrated in FIGS. 1-8 comprises an approximately vertical and cylindrical reaction tube within which water flows up and down in response to wave motions at the embodiment. However, unlike the embodiment illustrated in FIGS. 1-8, the similar embodiment is an oscillating water column, and contains a pocket of air above the mean level of the water 101 outside the vessel. In response to up and down movements of the water within the vessel's reaction tube, the pocket of air above the water within the reaction tube tends to be compressed and decompressed, and tends to cause portions of that air to flow out of, and into, an air turbine fluidly connected to both the pocket of air within the reaction tube and the atmosphere outside the embodiment.

Figure 10:
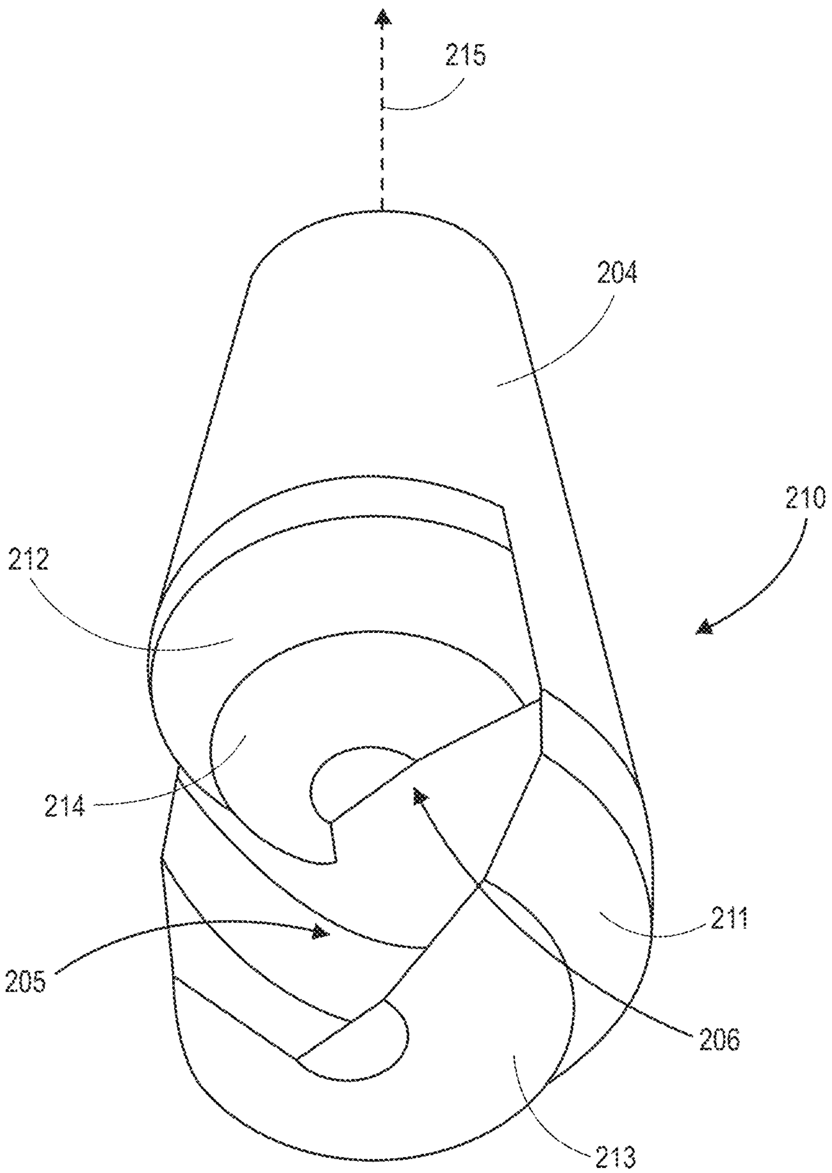
FIG. 10 is a perspective view illustration of a cavity with a lateral aperture for a vessel, in accordance with a second embodiment.

Referring now to FIG. 10, a perspective view illustration of a cavity 210 is shown, in accordance with an additional embodiment. The cavity 210 may be coupled to a tube of a vessel by a constriction 204. The tube and the vessel may be similar to the tube 103 and the vessel 100 described in greater detail herein. In an embodiment, the cavity 210 may be similar to the cavity 110 described in greater detail herein, with the exception of the first shell 211 and the second shell 212 comprising faceted surfaces. For example, a faceted surface 213 may be coupled to a bottom of the first shell 211, and a faceted surface 214 may be coupled to a bottom of the second shell 212. In an embodiment, the faceted surface 213 may be welded to the first shell 211, and the faceted surface 214 may be welded to the second shell 212. The use of such faceted surfaces 213 and 214 may allow for easier manufacture and assembly of the cavity 210 compared to the use of a monolithic first shell 211 and second shell 212.

In an embodiment, the first shell 211 and the faceted surface 213 may comprise an aperture 205. In an embodiment, the aperture 205 may have a width that is wider than a narrowest portion of the tube (not shown) that is coupled to an upper end of the constriction 204. In an embodiment, the second shell 212 and the faceted surface 214 may have an aperture 206. The aperture 206 may be along a plane that intersects a plane of the aperture 205. For example, the plane of the aperture 205 may be substantially parallel to the longitudinal axis 215, and the plane of the aperture 206 may intersect the longitudinal axis 215.

Figure 11:
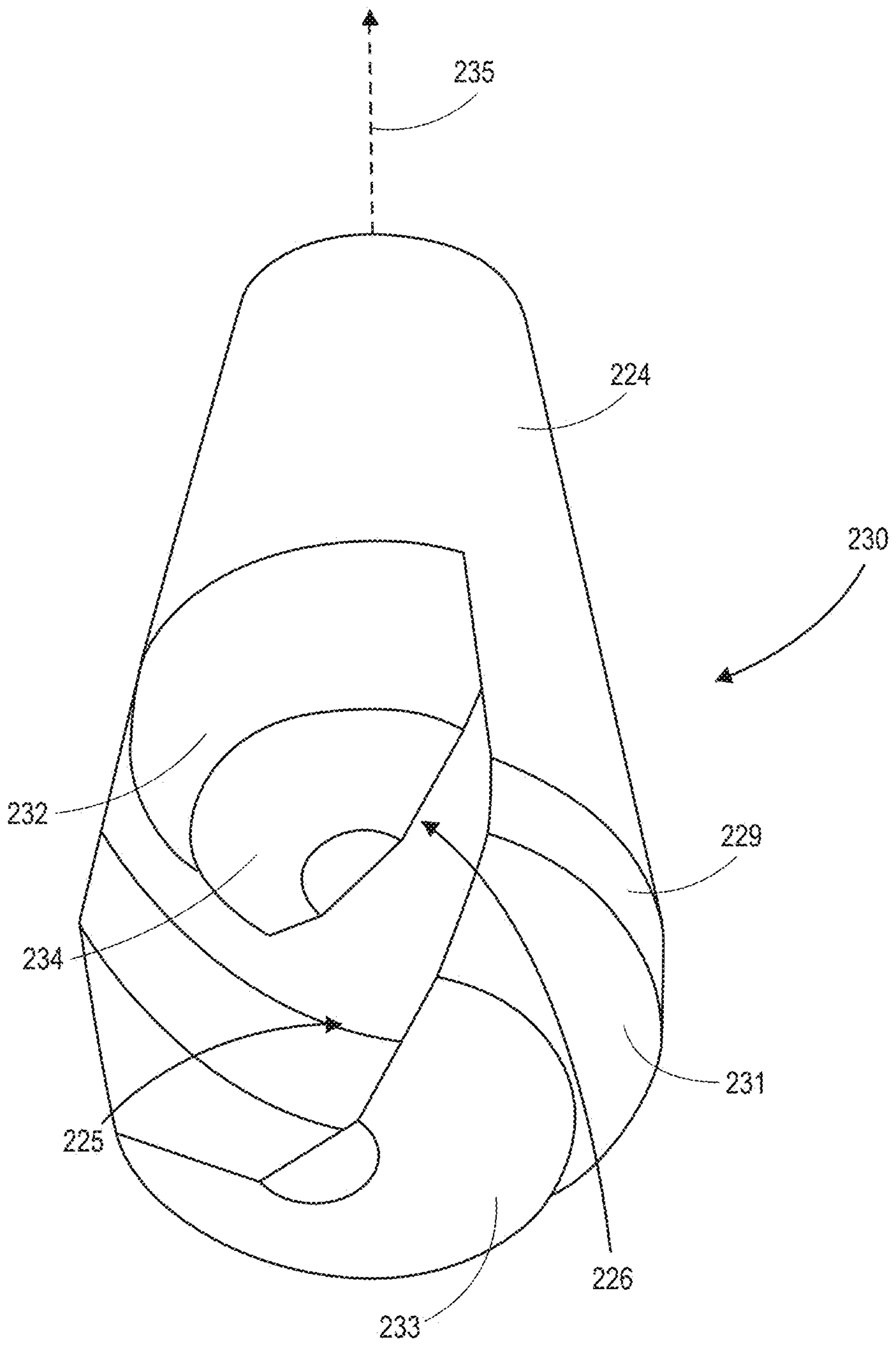
FIG. 11 is a perspective view illustration of a cavity with a lateral aperture for a vessel, in accordance with a third embodiment.

Referring now to FIG. 11, a perspective view illustration of a cavity 230 is shown, in accordance with an additional embodiment. The cavity 230 may be coupled to a tube of a vessel by a constriction 224. The tube and the vessel may be similar to the tube 103 and the vessel 100 described in greater detail herein. In an embodiment, the cavity 230 may be similar to the cavity 230 described in greater detail herein, with the exception of the aperture 226 of the second shell 232 and the faceted surface 234. For example, the aperture 226 may be approximately parallel to the longitudinal axis 235 or within approximately 20 degrees of being parallel to the longitudinal axis. In an embodiment, a first shell 231 may be coupled to the constriction 224 by a partial cylindrical portion 229. A bottom of the first shell 231 may be coupled to a faceted surface 233. In an embodiment, an aperture 225 of the first shell 231 may be substantially parallel to the longitudinal axis 235 of the cavity 235. In some instances, the plane of the aperture 225 and the plane of the aperture 226 may be the same. Though, in other embodiments, the plane of the aperture 225 and the plane of the aperture 226 may be offset from each other, but still parallel. Embodiments may also include the plane of the aperture 225 and the plane of the aperture 226 intersecting each other. In an embodiment, a width of the aperture 225 may be greater than a narrowest width of the tube (not shown) that is coupled to an upper end of the constriction 224, similar to other embodiments described herein.

Figure 12:
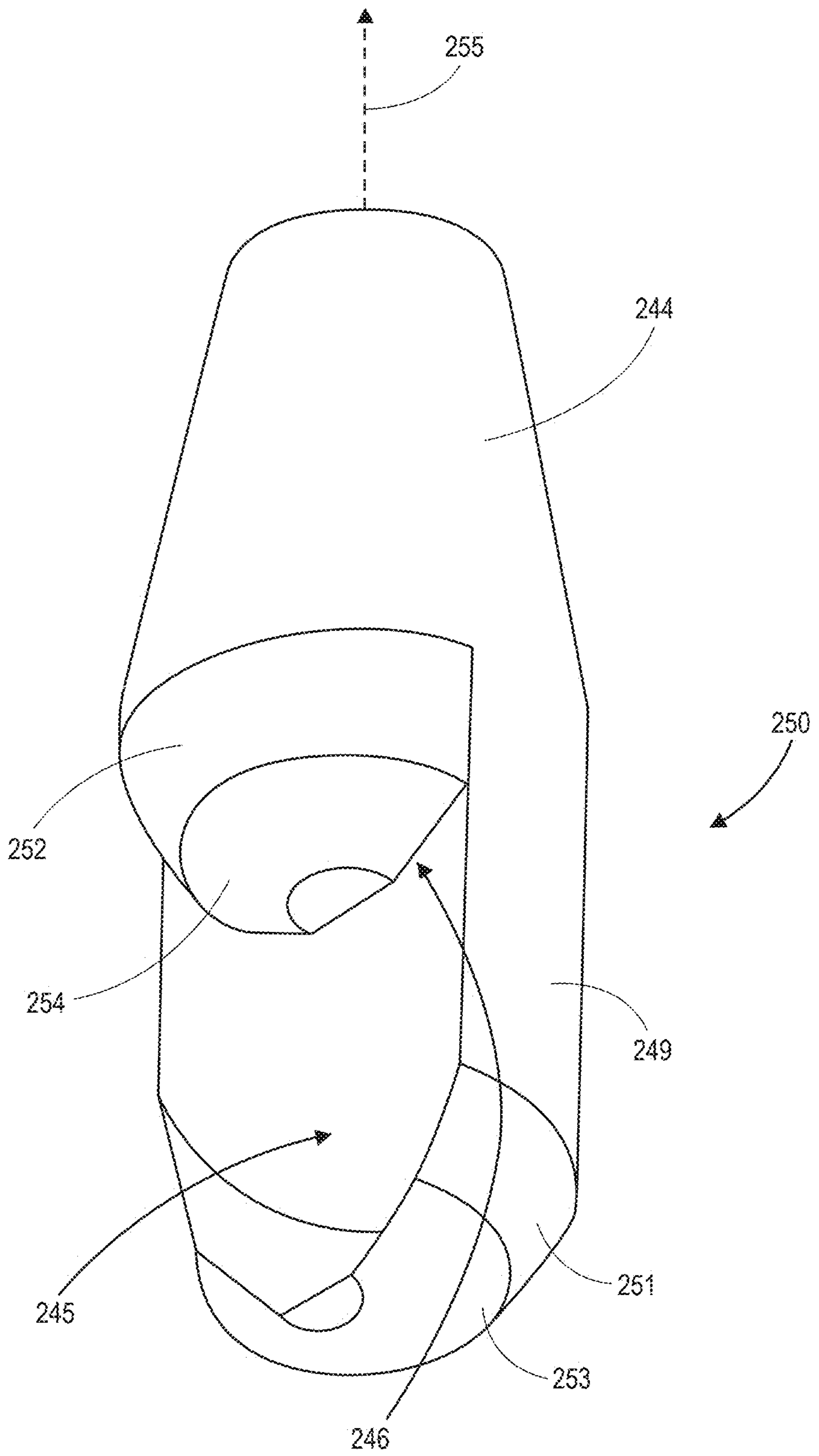
FIG. 12 is a perspective view illustration of a cavity with a lateral aperture for a vessel, in accordance with a fourth embodiment.

Referring now to FIG. 12, a perspective view illustration of a cavity 250 is shown, in accordance with an additional embodiment. The cavity 250 may be coupled to a tube of a vessel by a constriction 244. The tube and the vessel may be similar to the tube 103 and the vessel 100 described in greater detail herein. In an embodiment, the cavity 250 may be similar to the cavity 230 described in greater detail herein, with the exception of the partial cylindrical portion 249 coupled to the first shell 251 and the faceted surface 253. For example, the cylindrical portion 249 in FIG. 12 may have a height that is greater than the cylindrical portion 229 in FIG. 11. Extending the height of the cylindrical portion 249 allows for the overall area of the aperture 245 of the cavity 250 to be increased in some embodiments.

In an embodiment, an aperture 246 of the second shell 252 and a faceted surface 254 may be non-parallel to the longitudinal axis 255, or substantially parallel to the longitudinal axis 255. The aperture 245 may be considered as being a lateral aperture. For example, the aperture 245 may be substantially parallel to the longitudinal axis 255 in some embodiments. In an embodiment, the plane of the aperture 245 of the first shell 251 and the plane of the aperture 246 may be the same. Though, in other embodiments, the plane of the aperture 245 and the plane of the aperture 246 may be offset from each other, but still parallel. Embodiments may also include the plane of the aperture 245 and the plane of the aperture 246 intersecting each other. In an embodiment, a width of the aperture 245 may be greater than a narrowest width of the tube (not shown) that is coupled to an upper end of the constriction 244, similar to other embodiments described herein.

Figure 13:
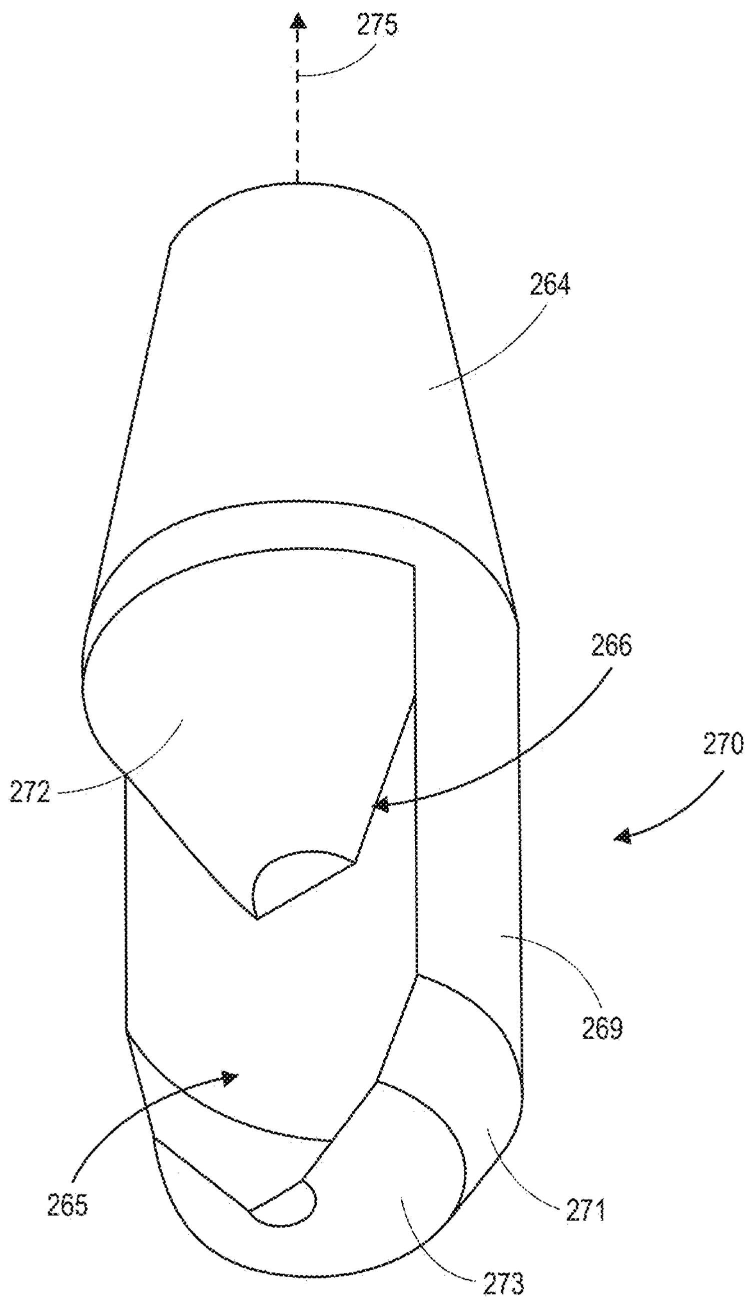
FIG. 13 is a perspective view illustration of a cavity with a lateral aperture for a vessel, in accordance with a fifth embodiment.

Referring now to FIG. 13, a perspective view illustration of a cavity 270 is shown, in accordance with an additional embodiment. The cavity 270 may be coupled to a tube of a vessel by a constriction 264. The tube and the vessel may be similar to the tube 103 and the vessel 100 described in greater detail herein. In an embodiment, the cavity 270 may be similar to the cavity 250 described in greater detail herein, with the exception of second shell 272. For example, the second shell 272 may have a partial frustoconical shape or cone-like shape. The frustoconical shape of the second shell 272 may have a segment removed to form the aperture 266 of the second shell 272.

In an embodiment, the aperture 266 of the second shell 272 may be non-parallel to the longitudinal axis 275, or substantially parallel to the longitudinal axis 275. The aperture 265 of the second shell 271, a faceted surface 273, and a cylindrical portion 269 may be considered as being a lateral aperture of the cavity 270. For example, the aperture 265 may be substantially parallel to the longitudinal axis 275 in some embodiments. In an embodiment, the aperture 265 of the first shell 271 and the plane of the aperture 266 may be the same. Though, in other embodiments, the plane of the aperture 265 and the plane of the aperture 266 may be offset from each other, but still parallel. Embodiments may also include the plane of the aperture 265 and the plane of the aperture 266 intersecting each other. In an embodiment, a width of the aperture 265 may be greater than a narrowest width of the tube (not shown) that is coupled to an upper end of the constriction 264, similar to other embodiments described herein.

In the embodiments described with respect to FIGS. 1-13, the cavities are not axisymmetric. For examples, the cavities described previously may include interlocking shells that both have apertures in order to allow water to flow through the cavity in a controlled manner. However, embodiments disclosed herein may also comprise cavities that are substantially axisymmetric. As used herein, a "substantially axisymmetric cavity" may refer to a cavity that is axisymmetric with the exception of a cutout used to form an aperture. Though, axisymmetric structures herein may depart from a perfectly axisymmetric shape due to one or more of manufacturing tolerances, joining process variations, and/or the like. Further, while apertures described previously herein may be substantially along a single plane, embodiments disclosed herein may also include cavities with apertures that are formed through more than one plane.

Figure 14:
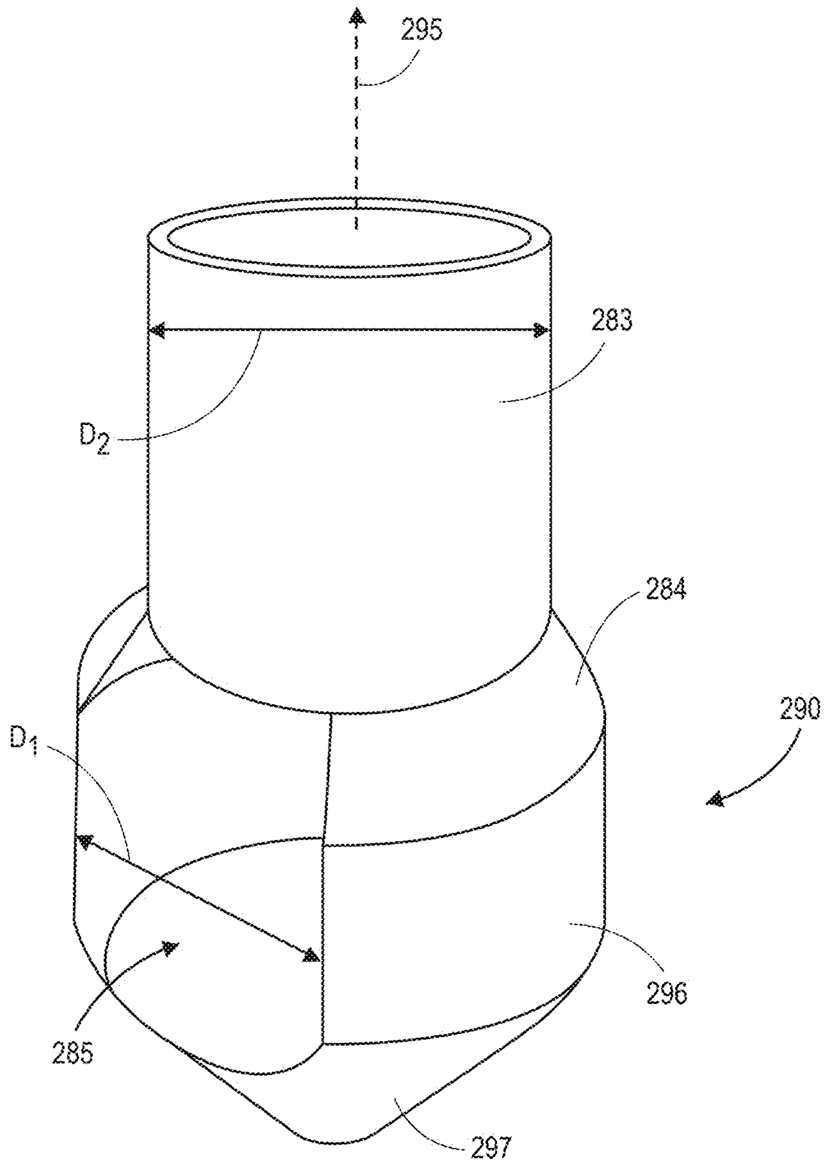
FIG. 14 is a perspective view illustration of a cavity with a lateral aperture for a vessel, in accordance with a sixth embodiment.

An example of such an embodiment is shown in FIG. 14. FIG. 14 is a perspective view illustration of a cavity 290 is shown, in accordance with an additional embodiment. The cavity 290 may be coupled to a tube 283 of a vessel (not shown). The tube 283 and the vessel may be similar to the tube 103 and the vessel 100 described in greater detail herein. In an embodiment, the cavity 290 may comprise a plurality of rings 284 and 296 with a bottom cover 297 that are coupled together as a single monolithic structure or through welded interfaces or the like. For example, a first ring 284 may be coupled to the tube 283, a second ring 296 may be coupled to the first ring 284, and the bottom cover 297 may be coupled to the second ring 296. The first ring 284 may be frustoconical with a narrow end coupled to the tube 283 and a wide end coupled to the second ring 296. The frustoconical shape allows for an expansion of a diameter of the cavity 290 relative to a diameter of the tube 283. In an embodiment, the second ring 296 may be substantially cylindrical, and the bottom cover 297 may be conical (as shown in FIG. 14), curved, flat, or any other suitable shape.

As shown, an aperture 285 may be cut into the cavity 290. The aperture 285 may be a lateral aperture in some embodiments. For example, at least a portion of the aperture 285 may be provided along a plane that is non-orthogonal to the longitudinal axis 295 of the tube 283. Additionally, a bottom surface of the cavity 290 comprises a tangent that is up to 20° from being orthogonal to the longitudinal axis of the tube 283. In an embodiment, the aperture 285 may be positioned through the first ring 284 and the second ring 296 so that the first ring 284 and the second ring 296 are ring segments instead of complete rings. Though, in other embodiments, the aperture 285 may be formed partially through a height of one or both of the first ring 284 and/or the second ring 296, so that one or both of the first ring 284 and/or the second ring 296 form a complete ring in at least some cross-sections along a plane orthogonal to the longitudinal axis 295 of the tube 283. The aperture 285 may also extend into the bottom cover 297. In an embodiment, the aperture 285 may have a first width $D_1$ that is wider than a narrowest width (i.e., a second width $D_2$) of the tube 283, similar to other embodiments described herein.

Figure 15A:
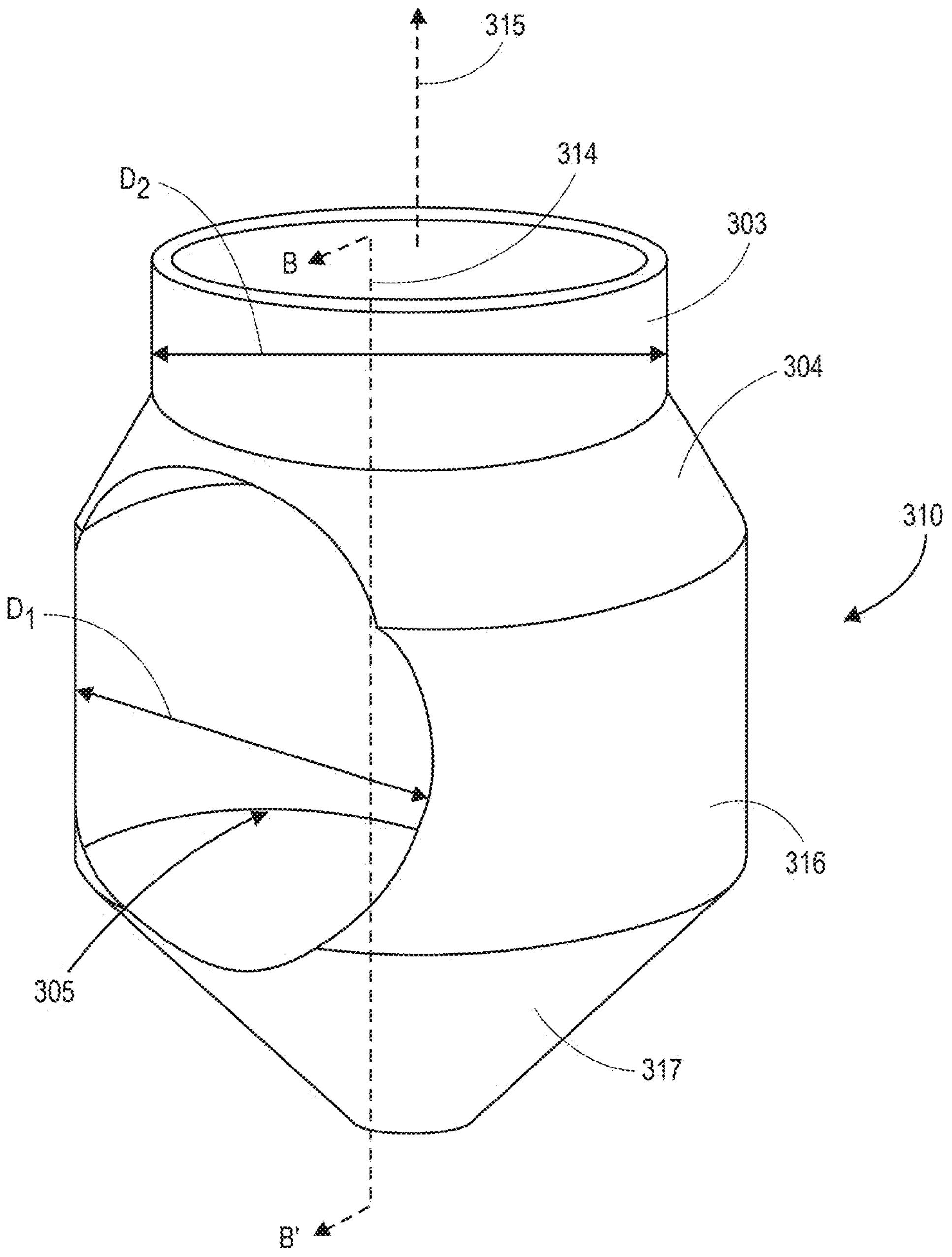
FIG. 15A is a perspective view illustration of a cavity with a lateral aperture for a vessel, in accordance with a seventh embodiment.

Referring now to FIG. 15A a perspective view illustration of a cavity 310 is shown, in accordance with an additional embodiment. The cavity 310 may be coupled to a tube 303 of a vessel (not shown). The tube 303 and the vessel may be similar to the tube 103 and the vessel 100 described in greater detail herein. In an embodiment, the cavity 310 may comprise a plurality of rings 304 and 316 with a bottom cover 317 that are coupled together as a single monolithic structure or through welded interfaces or the like. For example, a first ring 304 may be coupled to the tube 303, a second ring 316 may be coupled to the first ring 304, and the bottom cover 317 may be coupled to the second ring 316. The first ring 304 may be frustoconical with a narrow end coupled to the tube 303 and a wide end coupled to the second ring 316. The frustoconical shape allows for an expansion of a diameter of the cavity 310 relative to a diameter of the tube 303. In an embodiment, the second ring 316 may be substantially cylindrical, and the bottom cover 317 may be conical (as shown in FIG. 15), curved, flat, or any other suitable shape.

As shown, an aperture 305 may be cut into the cavity 310. The aperture 305 may be a lateral aperture in some embodiments. For example, at least a portion of the aperture 305 may be provided along a plane that is non-orthogonal to the longitudinal axis 315 of the tube 303. Additionally, a bottom surface of the cavity 310 comprises a tangent that is up to 20° from being orthogonal to the longitudinal axis of the tube. In an embodiment, the aperture 305 may be positioned through the second ring 316 so that the first ring 304 is a ring segment instead of a complete ring. The aperture 305 may be formed partially through a height of the first ring 304, so that the first ring 304 forms a complete ring in at least some cross-sections along a plane orthogonal to the longitudinal axis 315 of the tube 303. The aperture 305 may also extend into the bottom cover 317. The aperture 305 may have curved edges in some embodiments. In an embodiment, the aperture 285 may have a first width $D_1$ that is wider than a narrowest width (i.e., a second width $D_2$) of the tube 283, similar to other embodiments described herein.

Figure 15B:
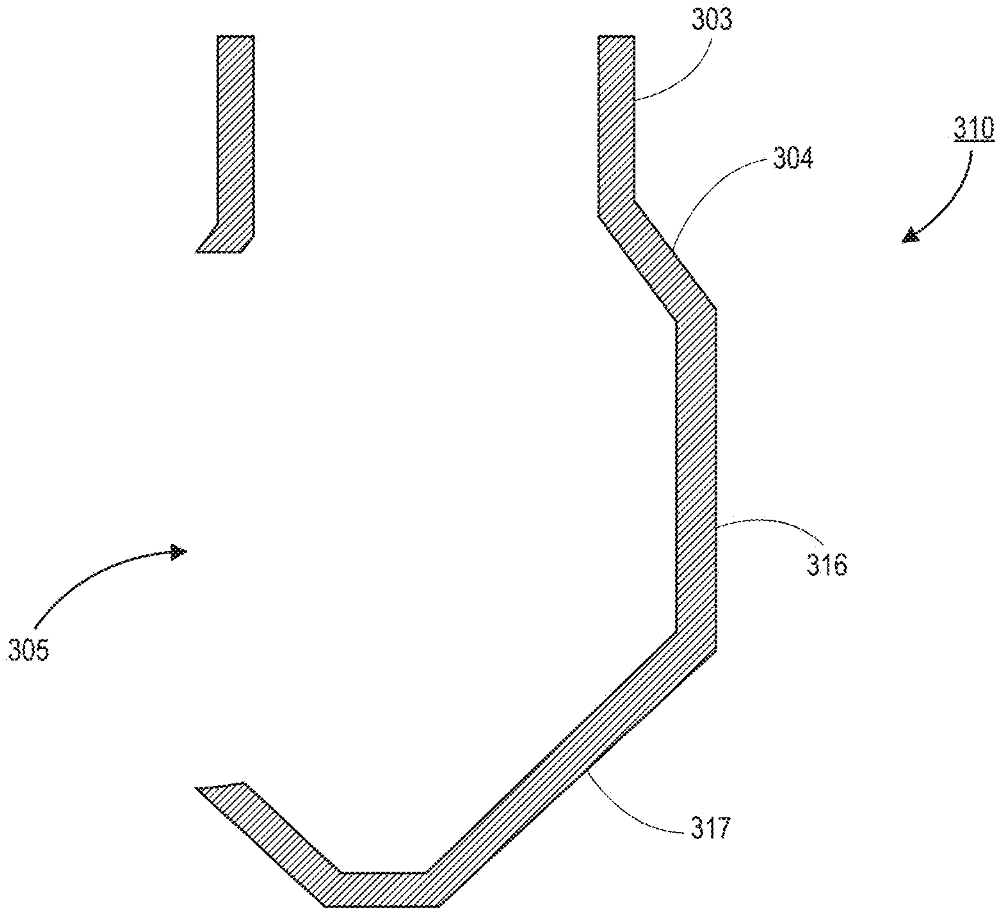
FIG. 15B is a cross-sectional illustration of the cavity with a lateral aperture in FIG. 15A along line B-B', in accordance with the seventh embodiment.

Referring now to FIG. 15B, a cross-sectional illustration of the cavity 310 in FIG. 15A along line B-B' is shown, in accordance with an embodiment. In some embodiments, the cavity 310 may have substantially linear inner surfaces that forms an elbow that fluidically couples the aperture 305 to the tube 303. That is, cavity 310 may be defined by one or more thin sheets of metal and/or tubing that are coupled together to direct the flow of fluid from the lateral aperture 305 to the vertical tube 303.

Figure 16:
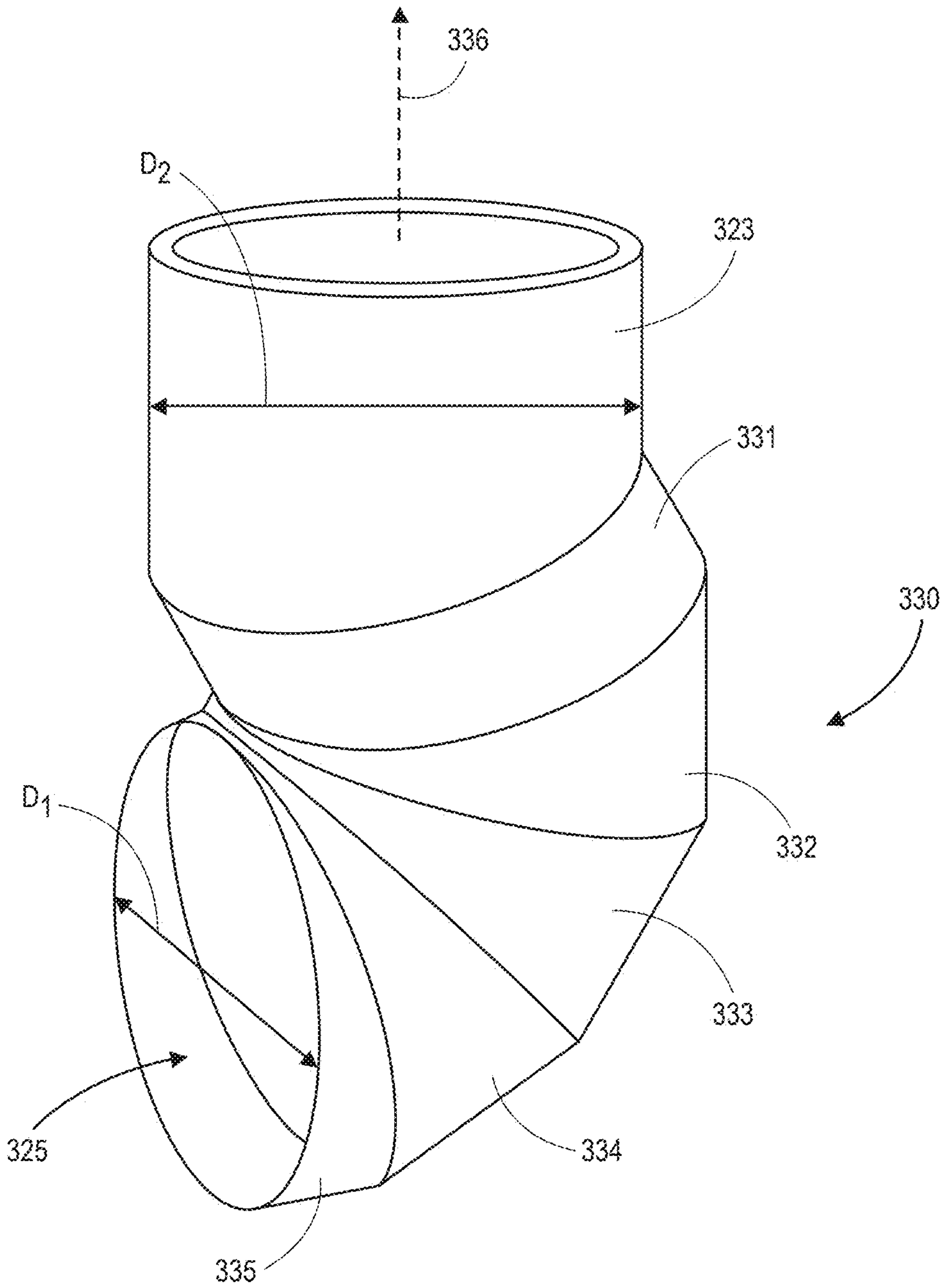
FIG. 16 is a perspective view illustration of a cavity with a lateral aperture for a vessel, in accordance with an eighth embodiment.
Figure 17:
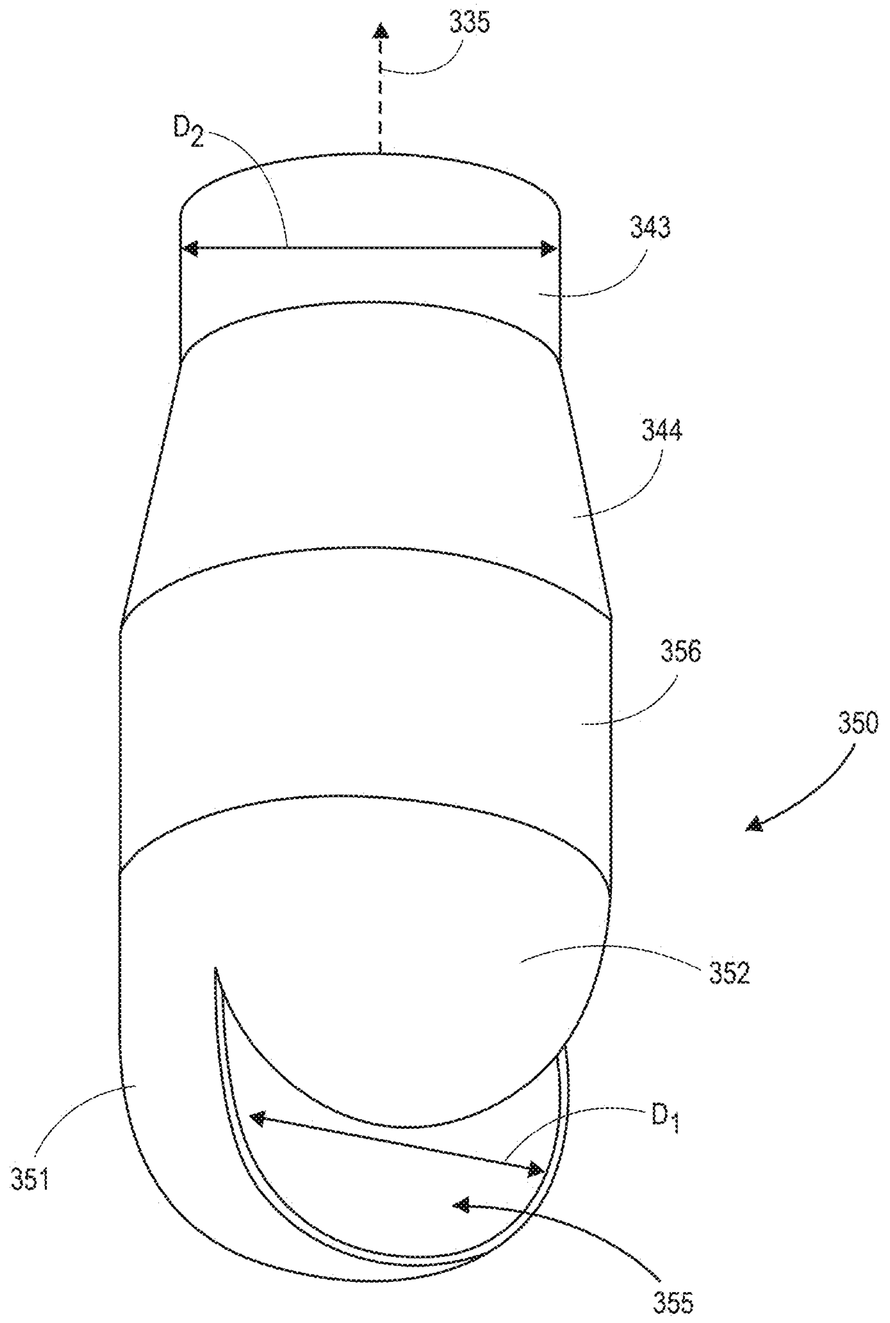
FIG. 17 is a perspective view illustration of a cavity with a lateral aperture for a vessel, in accordance with a nineth embodiment.

Referring now to FIG. 16, a perspective view illustration of a cavity 330 is shown, in accordance with an additional embodiment. The cavity 330 may be coupled to a tube 323 of a vessel (not shown). The tube 323 and the vessel may be similar to the tube 103 and the vessel 100 described in greater detail herein. As shown, the cavity 330 may comprise a plurality of segments 331-335 that form an offset elbow shape. An "offset elbow shape" may refer to a generally curved or claw-like shape that extends out past an outer edge of the tube 323. In an embodiment, the segments 331-335 may be coupled together by welding or the like. While shown as discrete segments, some embodiments may also include an offset elbow shaped cavity that is formed as a continuous tube. The offset elbow shape of the segments may allow for the aperture 325 to be oriented laterally. That is, the aperture 325 may be non-orthogonal to the longitudinal axis 336 of the tube 323. In an embodiment, the aperture 325 may be substantially circular. Though, other shaped apertures 325 may also be used in some embodiments. In an embodiment, a width of the aperture 325 (i.e., a first width $D_1$) may be greater than a minimum width of the tube 323 (i.e., a second width $D_2$), similar to other embodiments described in greater detail herein. In an embodiment, a bottom surface of the cavity 330 comprises a tangent that is up to 20° from being orthogonal to the longitudinal axis of the tube Referring now to FIG. 17, a perspective view illustration of a cavity 350 is shown, in accordance with an additional embodiment. The cavity 350 may be coupled to a tube 343 of a vessel (not shown). The tube 343 and the vessel may be similar to the tube 103 and the vessel 100 described in greater detail herein. In an embodiment, the cavity 350 may be coupled to the tube 343 by a frustoconical constriction 344 that expands a width of the tube 343. A cylindrical portion 356 of the cavity 350 may couple an elbow to the constriction 344. In an embodiment, the elbow may comprise a first shell 351 with a vertical upper portion and a partial spherical lower portion, and the elbow may further include an interfacing second shell 352 with a partial spherical shape. In an embodiment, the spherical lower portion of the first shell 351 may have a larger diameter than partial spherical shape of the second shell 352.

Figure 18A:
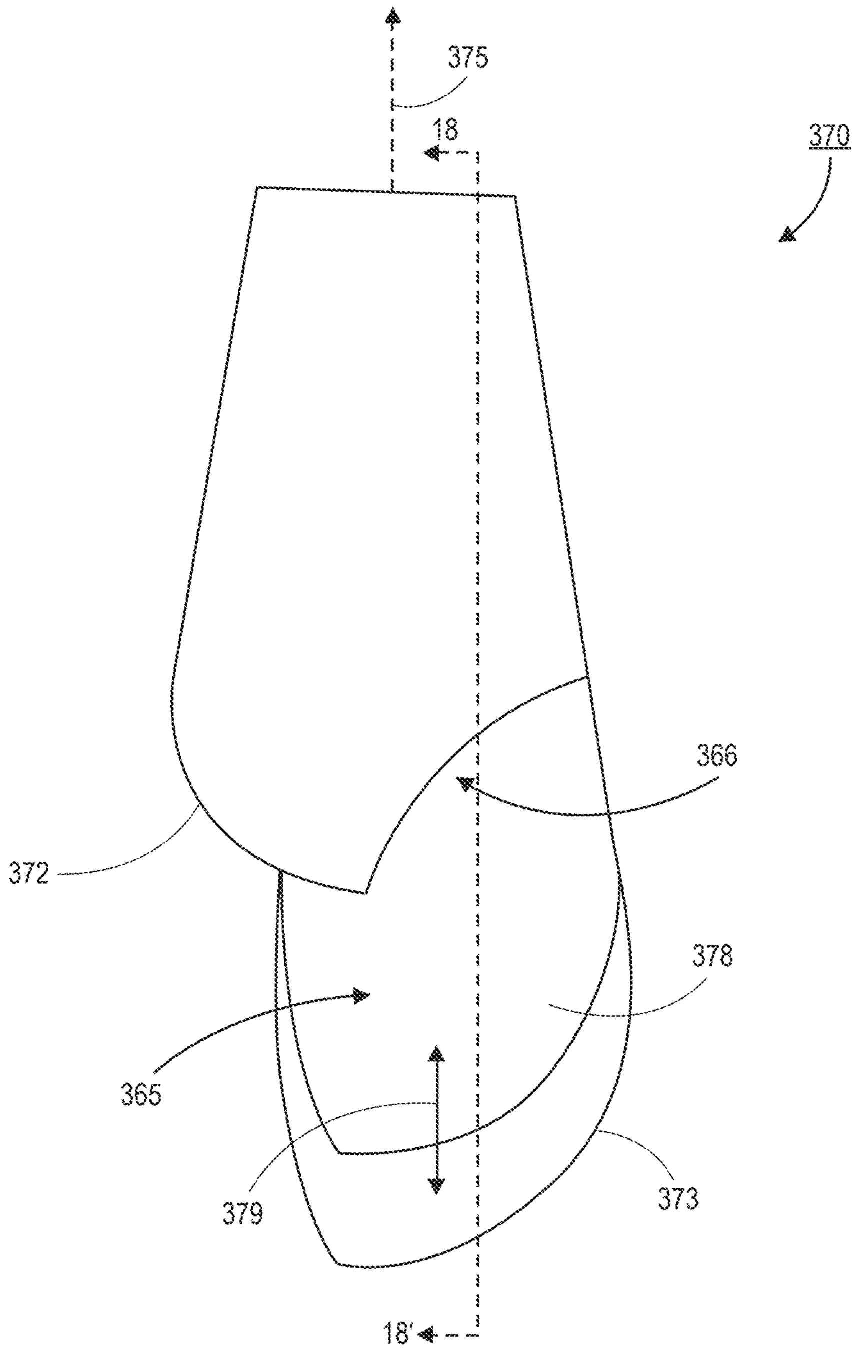
FIG. 18A is a sectional illustration of a cavity with an adjustable lateral aperture for a vessel, in accordance with a tenth embodiment.

In an embodiment, the second shell 352 covers a portion of an aperture 355 of the first shell 351. A width of the aperture 355 (i.e., a first width $D_1$) may be wider than a width of the tube 343 (i.e., a second width $D_2$). In an embodiment, the aperture 355 may be a lateral aperture. That is, the aperture 355 may be along a plane that is non-orthogonal to a longitudinal axis 335 of the tube 343. In an embodiment, a bottom surface of the cavity 350 comprises a tangent that is up to 20° from being orthogonal to the longitudinal axis of the tube Referring now to FIG. 18A, a sectional illustration of a cavity 370 is shown, in accordance with an additional embodiment. The cavity 370 may be coupled to a tube of a vessel (both not shown). The tube and the vessel may be similar to the tube 103 and the vessel 100 described in greater detail herein. The sectional view shown in FIG. 18A illustrates the outer profile of the cavity 370 as well as the aperture 365 of a first shell 373 and the aperture 366 of a second shell 372. Additionally, the cavity 370 may include a displaceable shell 378 that is set within the first shell 373. The displaceable shell 378 may displace in a vertical direction, as indicated by double sided arrow 379. Changing the position of the displaceable shell 378 alters an interior geometry of the cavity 370 and/or a geometry of the aperture 365. The change in the interior geometry of the cavity 370 may be used to alter a magnitude of the propulsive thrust generated by the cavity 370 during oscillation of the vessel (not shown) to which the cavity 370 is attached.

Figure 18C:
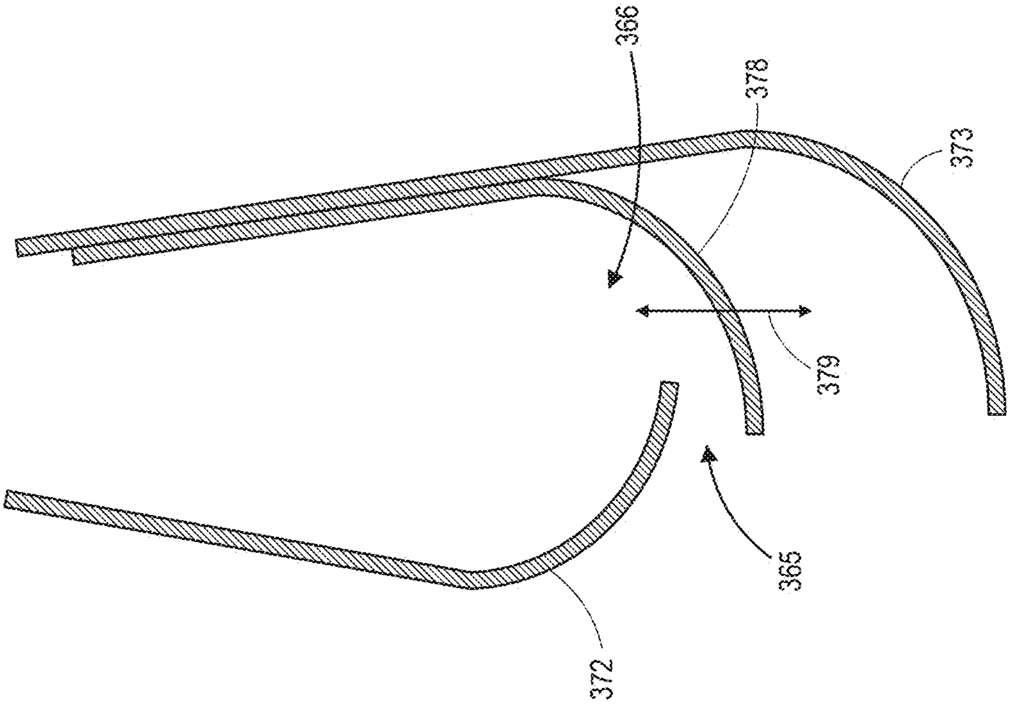
FIG. 18C is a cross-sectional illustration of the cavity in FIG. 18A along line 18-18' in a second configuration, in accordance with an additional embodiment.
Figure 18B:
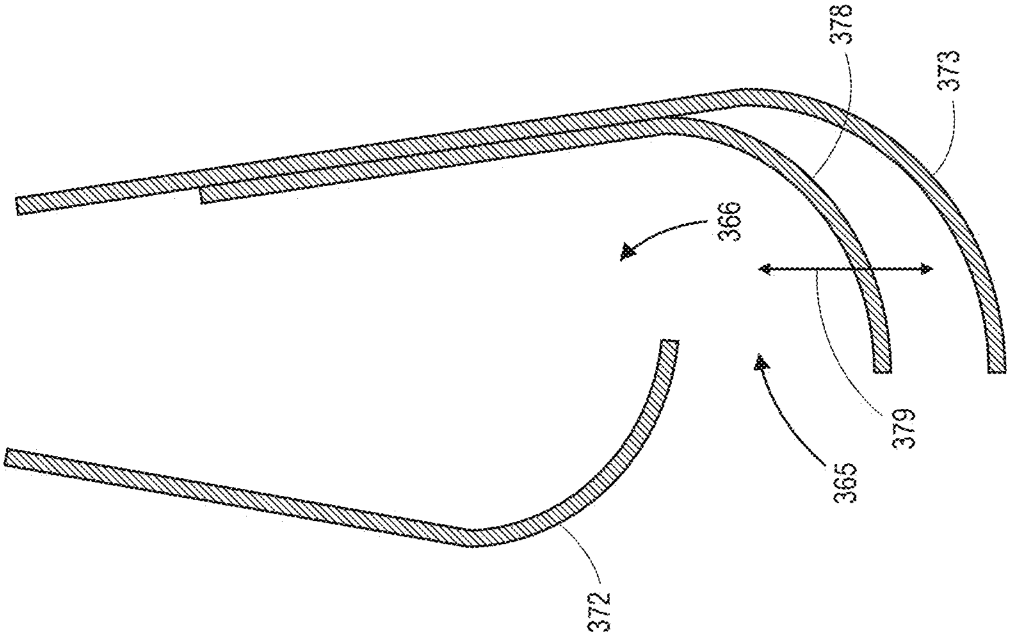
FIG. 18B is a cross-sectional illustration of the cavity in FIG. 18A along line 18-18' in a first configuration, in accordance an embodiment.

The movement of the displaceable shell 378 is clearly indicated in FIGS. 18B and 18C, which represent cross-sectional views of FIG. 18A. The displaceable shell 378 in FIG. 18B is located in a lower position compared to the position of the displaceable shell 378 in FIG. 18C. Accordingly, the aperture 365 in FIG. 18B has a larger area and can accommodate more fluid flow than the aperture 365 in FIG. 18C.

In the embodiments disclosed herein, vessels with cavities at a lower end of the tube are disclosed in order to provide wave-induced propulsion of the vessel. Vessels that may benefit from such propulsion may be used for various tasks. In some embodiments, the vessels described herein may be used to generate an energy product. The energy product may be generated through a process that converts wave energy into the energy product. Vessels that produce an energy product may sometimes be referred to as a wave energy converter (WEC) or a WEC device.

As used herein, energy products may include, but are not limited to, fuels (e.g., hydrogen and/or carbon containing fuels), chemicals (e.g., HCl), biological species, digital goods and/or services, and the like. In some instances, "chemicals" may be used to refer to energy products that are fuels (e.g., hydrogen gas) and/or non-fuel chemistries (e.g., HCl). Since the WEC may be located at sea, the energy products may be transported back to land for consumption, use, storage, or the like. Examples of energy product generation at the WEC and transport schemes or processes are described with respect to FIG. 19-32.

Figure 19:
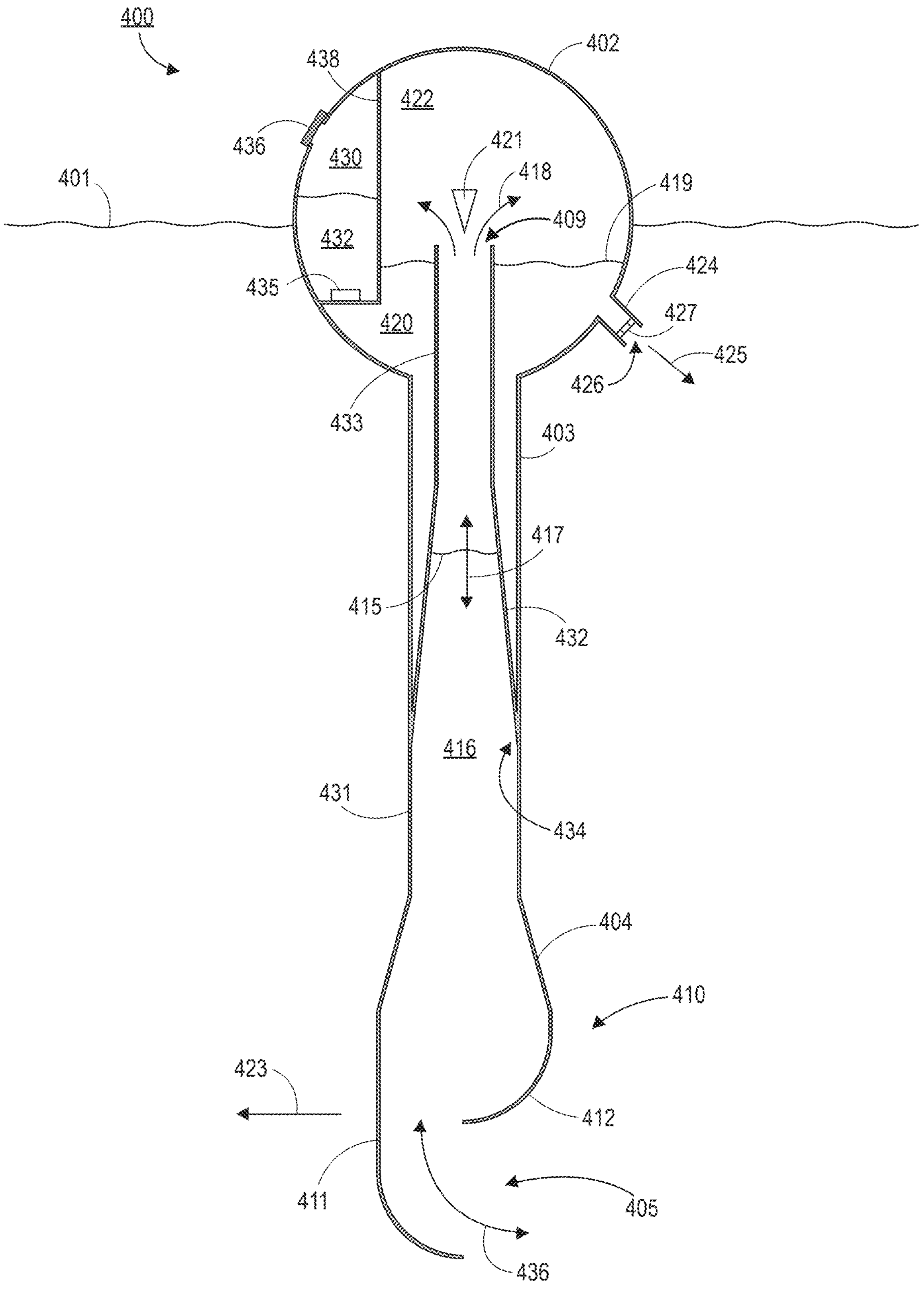
FIG. 19 is a cross-sectional view of a vessel with a cavity with a lateral aperture that is capable of producing excess chemicals for harvesting, in accordance with an embodiment.

FIG. 19 illustrates a cross-sectional view of a WEC 400 with a cavity 410 for generating a propulsive thrust 423, in accordance with an embodiment. The WEC 400 floats adjacent to an upper surface of a body of water 401 over which waves pass. The WEC 400 may include a buoyant chamber 402 with an interior volume 422. The interior volume 422 may be partially filled with water 420. Gasses (e.g., oxygen, hydrogen, air, or the like) may fill additional portions of the interior volume 422. Internal structures may also be provided within the buoyant chamber 402. For example, baffles, walls, sub-chambers, doors, or the like may be provided within the chamber 402. The internal structures may be used to control flow or movement of water 420 within the chamber 402, provide housing for different gas species, or the like.

The chamber 402 may be axially symmetric in some instances. For example, in FIG. 19, the chamber 402 is a spherical segment with a substantially horizontal top surface. In other instances, the chamber 402 may be a spherical cap, or any other type of axially symmetric shape. Though, the chamber 402 may be non-axially symmetric in other instances. For example, the chamber 402 may have a keel or hull shape similar to that of a floating vessel (e.g., a boat or ship). Openings, ports, or the like may also be provided through the walls of the chamber 402 in order to access materials and/or substances within the chamber 402, to provide control of pressure within the chamber 402, and/or the like.

A tube 403 may be coupled to the chamber 402. The tube 403 may be coupled to a lower cavity 410 by a constriction 404. The cavity 410 may have a lateral aperture 405 that is in fluid communication with the water 401 surrounding the WEC 400. The tube 403 may be substantially cylindrical in some embodiments. In an embodiment, an internal tube 431, 432, 433 may be within the tube 403, and a portion of the internal tube 431, 432, 433 may pass into the upper chamber 402. The portion of the tube 433 may pass into the interior volume 422. An aperture 409 at the top of the tube 433 is fluidically coupled to the interior 422 of the chamber 402. The outer tube 403 may have a constant diameter through its length. The inner tube 431, 432, 433 may have a non-uniform diameter through its length. For example, the portion of the tube 431 may have a substantially constant diameter. In some instances, the portion of the tube 431 may be part of the outer tube 403. That is, at location 434, the outer tube 403 and the inner tube 431, 432, 433 may merge together. A second constricted portion of the inner tube 432 may reduce a diameter of the inner tube 431, 432, 433. The outer tube 403 and/or the inner tube 431, 432, 433 may be cylindrical or have any other shaped cross-sections.

As shown, water 416 may reside in the inner tube 431, 432 with a free surface 415. As indicated by the double arrow 417 across the free surface 415, the level of the oscillates up and down in response to oscillation of the WEC 400. Oscillation is driven by interaction with waves that pass along the surface of the body of water 401. The confined water 416 within the inner tube 432 may acquire momentum during oscillation of the WEC 400. At some points in time, the free surface 415 rises above the top aperture 409 of the tube 433 and is expelled (as indicated by arrows 418) into the interior volume 422 of the chamber 402. A diverter 421 may be provided over the top aperture 409 in some embodiments. The water 416 from the tube 432 maintains a level 419 of water 420 within the chamber 402.

In order to generate energy, water 420 from the interior of the chamber 402 is expelled out a pipe 424. As water 425 passes through an aperture 426 of the pipe 424, an energy generation device 427 is engaged. The energy generation device 427 may comprise a hydropower turbine, such as a reaction turbine (e.g., a propeller turbine, a bulb turbine, a straflo turbine, a tube turbine, a Kaplan turbine, a Francis turbine, or a kinetic turbine) or an impulse turbine (e.g., a Pelton turbine, or a cross-flow turbine). In some instances, a single turbine is used for the energy generation device 427, and in other instances, multiple turbines arranged in series are used for the energy generation device 427. While a single energy generation device 427 is shown in the WEC 400, embodiments may include a plurality of energy generation devices 427.

The energy generation device 427 may be coupled to an electrical generator (not shown). The energy generation device provides rotational energy which is converted into electrical energy by the electrical generator. The electrical energy may be stored (e.g., in a battery) or consumed for one or more purposes, which will be described in greater detail herein. While an electrical generator is one option, other generator types may also be used. For example, generators described herein may include any generator, alternator, other mechanism, device, and/or component that converts energy from one form into another. In some instances, one or more of the energy generation systems may be replaced with a magnetohydrodynamic (MHD) generator, which generates electricity directly from a flow of liquid without the need for connection with a turbine and associated rotating shaft. That is, a combination of a turbine connected to a generator by a shaft can be replaced, in some instances and with an appropriate choice of working fluid, with a MHD generator.

As noted above, WEC 400 may generate significant amounts of energy that needs to be stored or used in a constructive manner. In some instances, energy generated from WEC 400 may be stored in a battery. The battery may provide an accessible energy source in order to run one or more electrical components integrated into the WEC 400. Alternatively (or in addition), WEC 400 may provide a material conversion process in order to "store" energy in a more transportable form. For example, energy generated by WEC 400 can be stored in the form of an energy product, such as those described in greater detail herein.

In the case of the energy product being hydrogen gas, an electrolyzer 435 may be provided on the WEC 400. The electrolyzer 435 may be fluidly coupled to a water source, such as water 445 within a chamber 438. Water 445 may be deionized, filtered, distilled and/or otherwise purified. Water 445 may be provided to the WEC 400 as a precursor material. Energy generated by the WEC 400 may be consumed by the electrolyzer 435 to convert water into oxygen and hydrogen. The hydrogen gas may be stored in the internal volume 430 of the chamber 438, or any other confined space associated with the WEC 400. The oxygen gas may be vented to atmosphere in some embodiments. After hydrogen gas is produced, the gas may be collected (i.e., removed or offloaded from the WEC 400 through port 439) periodically by an external vessel, ship, air-ship, submersible, drone, or any other vehicle.

WEC 400 may be an autonomous device with the ability to move and/or navigate in a controlled manner about the body of water. Propulsion of the WEC 400 may be driven through one or more different mechanisms. In one embodiment, the cavity 410 may provide a wave induced propulsive thrust 423. For example, a cavity similar to any of the cavities described herein may be coupled to a lower end of the tube 403. The cavity 410 may have a lateral aperture 405 that allows for water 416 to flow 436 into and out of the WEC 400. As described herein, the controlled confinement of the water 416 produces an unbalanced force against an inner surface of the cavity 410 in order to propel the WEC 400 in a forward direction (i.e. to the left with respect to FIG. 19). In the particular embodiment shown in FIG. 19, the cavity 410 comprises an interlocking first shell 411 and second shell 412.

In another embodiment, the expelled water 425 out of the pipe 424 provides a propulsive force that can move the WEC 400. The WEC 400 can be steered through control of the force of the expelled water 425 and/or the direction of the expelled water 425. In some instances, one or more rudders (not shown) can be coupled to the WEC 400 in order to provide directional control, rotational control, and/or the like.

In some embodiments, propulsion of the WEC 400 may be provided through one or more active propulsion devices. For example, propellers or the like may be used in some instances. Energy to drive the active propulsion devices may be obtained through the energy generation of the WEC 400, or from batteries that is charged through the wave-energy generation of the WEC 400. In other instances, hydrogen or other gasses generated on the WEC 400 can be consumed (e.g., through the use of a fuel cell) in order to power active propulsion devices.

In an embodiment, one or more electrical components (not shown) may be coupled to the WEC 400. For example, an enclosure coupled to the WEC 400 (e.g., exterior to the chamber 402 and/or within the chamber 402) may house one or more electrical components. The electrical components may include one or more of, a computing system, a positioning system, and/or a communications system. The computing system may provide one or more processors and associated hardware and/or software that enables control of the WEC 400. For example, the computing system may control power generation, such as by controlling flow rates of water to the energy generation device 427. The positioning system may include a GPS, a compass, an accelerometer, a gyroscope, or any other suitable navigational system. The positioning system may control propulsion and steering systems in order to navigate the WEC 400. The communications system may include an antenna, a receiver, and associated circuitry, hardware, and/or software. The communications system may provide a communication link to external systems, other waver-energy generation systems, or the like. The systems described on the WEC 400 are exemplary in nature, and it is to be appreciated that many different systems, control apparatuses, and/or the like may be provided on the WEC 400.

As will be described in greater detail below, the energy products produced by the WEC may be subsequently delivered to shore (or near shore) for use, storage, or the like. The energy product may be transported to shore through one or more vessels. In some instances, the energy product is transported to shore without further modification. For example, a hydrogen gas may be generated by the WEC, and the hydrogen gas is transported to shore. In other instances, the energy product may be used to generate a different energy product. For example, the energy product may be a precursor that is used in the generation of an alternative energy product (e.g., an energy product that has a higher energy density). In one example, a hydrogen energy product may be converted into methanol or ammonia through a chemical reaction with one or more other precursor gasses. This additional conversion may occur at the WEC or during transport of the energy product to shore.

Figure 20:
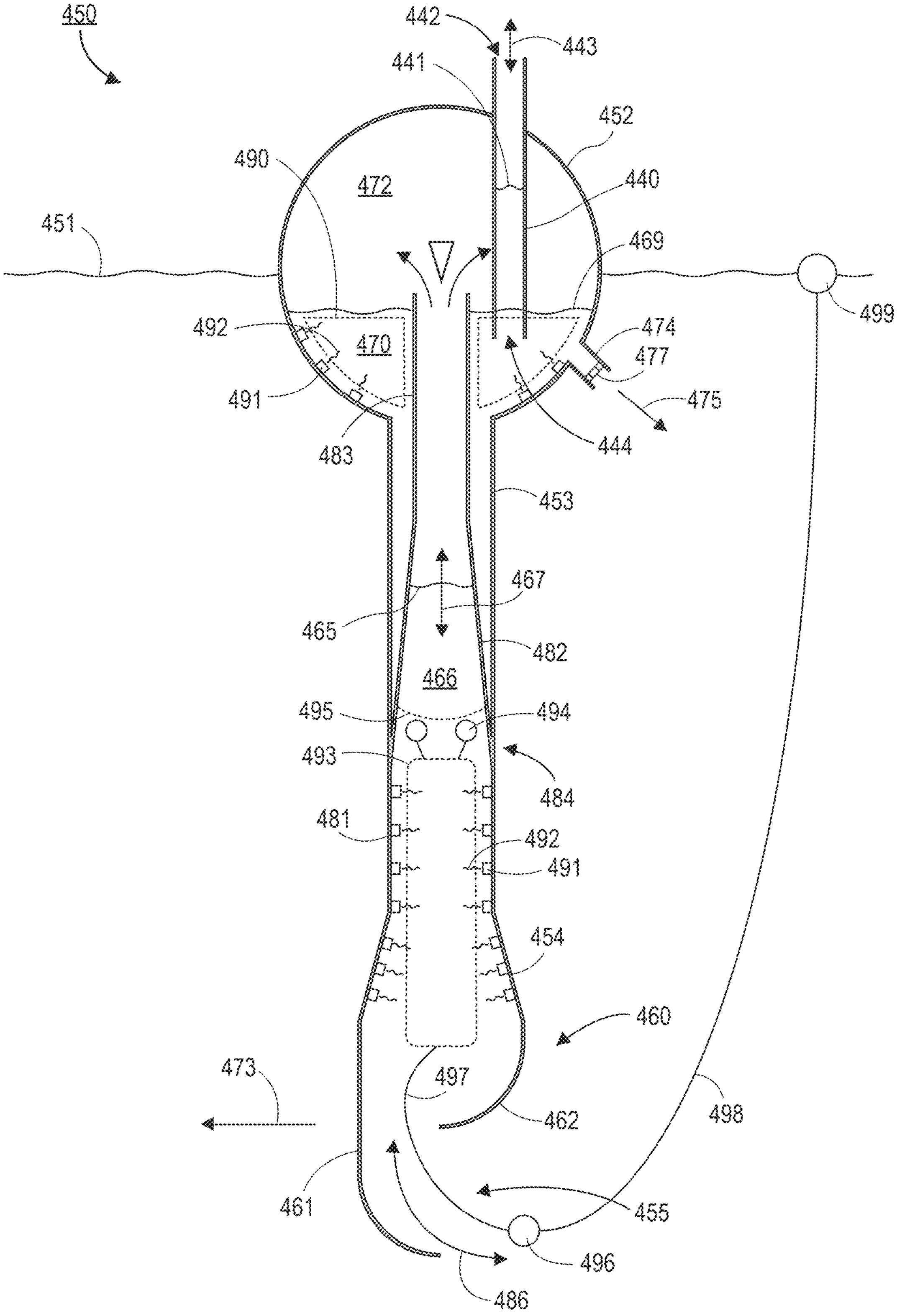
FIG. 20 is a cross-sectional view of a vessel with a cavity with a lateral aperture that illustrates the generation of biological products within the vessel, in accordance with an embodiment.

FIG. 20 illustrates a cross-sectional view of a WEC 450 with a cavity 460 with a lateral aperture 405 is shown, in accordance with an embodiment. The WEC 450 may be similar to the WEC 400 described above, with the exception of the energy product that is being generated or produced by the WEC 450. For example, WEC 450 may include a buoyant chamber 452 coupled to an inner tube 481, 482, 483 with an outer tube 453 around the inner tube 481, 482, 483. The inner tube may pass through a wall of the upper chamber 452. Water 466 within the inner tube 481, 482, 483 oscillates (as indicated by double arrow 467) so that the surface 465 raises and lowers within the inner tube 481, 482, 483. In some instances, water 466 may flow out of the tube into the interior 472 of the chamber 452 in order to fill water 470 in the chamber 452. Water 470 in the chamber 452 can be expelled down pipe 474, through energy generation device 477, and exit 475 the WEC 450 in order to generate energy.

However, instead of producing a gas as an energy product (or only gas), the WEC 450 may produce a biological product. The biological product may comprise one or more of marine algae (e.g., micro-alae and/or macro-algae), seaweed, other marine plants, fish, krill, or other marine organisms. More specifically, electrical power generated through the operation of an energy generation device 477 can be used to power lights 491, lamps, thermal devices (e.g., heaters), and/or the like. For example, lights 491 may be light emitting diode (LED) lights or any other suitable source for generating electromagnetic radiation 492. The electromagnetic radiation 492 can be consumed by the biological product within the WEC 450 in order to induce growth of the biological product.

As shown in FIG. 20, the lights 491 may be arranged, attached, or otherwise coupled to interior surfaces of the chamber 452. Additionally, lights 491 may be provided along sidewalls of the inner tube 481. While shown as being coupled directly to interior wall surfaces, other embodiments may comprise suspending lights 491 within an interior volume of the chamber 452. The lights 491 in FIG. 20 are all shown as being submerged in water 466 or 470. Though, in other embodiments, lights 491 may be provided above the surface 469 of the water 470 within the chamber 452.

In one instance, designed to promote the growth of biological products (e.g., algae and/or other marine based plant life), an approximately circular net 490 spans, and/or is adjacent to, an approximately flow-normal and/or horizontal cross-section of the water 470, adjacent to the surface of the water 470. Net 490 entrains the biological product within the lower portion of the water 470 thereby tending to reduce, if not prevent, the outflow and/or loss of that macroalgae through the energy generation device 477. In other embodiments, other structures (e.g. a sieve, catchment, mesh, or grating) are positioned in the path of water flow to the energy generation device 477 in order to prevent outflow or loss of biological products.

Periodically, biological products may be removed from the water 470 by a ship, platform, or other vessel. A ship may insert a suction tube into and through an access tube 440. Once inserted into and through access tube 440, an inserted suction tube can be positioned near the bottom of the embodiment's reservoir of water 470 and suck out a portion of the biological product therein. A complementary access tube (not shown), and/or a complementary channel within a single access suction tube 440, can return water to the reservoir while biological products, are being removed from the reservoir of water 470, thereby maintaining and/or preserving the original level of the water 470 in the reservoir.

The access tube 440 allows algae, water, nutrients, and/or other materials, to be added to, and/or withdrawn from, the reservoir of water 470 when that reservoir is otherwise sealed inside the chamber 452. Because the access tube is open to the atmosphere (as indicated by arrow 443) at its upper mouth 442, and open to the water and biological product in the water 470 at its lower mouth 444, water 470 from the reservoir is free to rise up within the algae access tube 440. Because of the pressure of the air trapped within the air pocket 472 of the interior of the chamber 452, and the corresponding pressure of the water 470, the surface 441 of the water within the access tube 440 tends to rise to a height above the surface of the water 470 within the reservoir whose head pressure approximately corresponds to the pressure of the air within hollow chamber 452.

In addition to growing biological products, especially macroalgae, within the water 470 reservoir inside the hollow chamber 452, biological products, especially macroalgae, may be grown inside the embodiment's inner tube 481. An upper barrier net 495 spanning an upper portion, and/or at an upper position, of the inner tube 482 prevents at least a portion of the algae within the inner tube 482 from too closely approaching the upper constricted portion of the inner tube 482 which, if not prevented, could potentially clog the inner tube 482 at that location.

Macroalgae or other biological products are grown within a net enclosure and/or containment bag 493 that forms a porous bag entraining most, if not all, of the biological products. An upper end of the algae containment bag 493 is pulled upward by a float 494, tending to position the upper end of the bag proximate to the lower side of the barrier net 495. The biological product within the containment bag 493 are encouraged to grow through the embodiment's provision of light, e.g. 492, emitted by lamps, e.g. 491, positioned along the interior wall and/or surface of the inner tube 481.

A lower end of the containment bag 493 is pulled downward by a weight 496 connected to the bag by a tether, chain, rope, linkage, and/or cable 497. Also connected to the weight 496, and therethrough to the containment bag 493, is a tether, chain, rope, linkage, and/or cable 498 an upper end of which is connected to a float 499 that tends to float at the surface 451 of the body of water on which the WEC 450 floats.

Periodically, biological products may be removed from the WEC's 400 inner tube 481 by a ship or other vessel. A ship may attach a secondary cable to cable 498 and then lower a secondary weight to increase the total weight tending to pull the algae containment bag 493 down and out of the inner tube 481 and the cavity 460. After the containment bag 493 has been pulled down and becomes free, the containment bag 493 may be pulled up by the secondary cable and therewith lifted onto and/or into the ship where its biological products may be harvested. The same containment bag 493 that was removed may be reinserted into the inner tube 481 using the same second cable, using an underwater autonomous vehicle, and/or using another method, mechanism, and/or system. If the same containment bag 493 is reinserted into the embodiment's inner tube 481, it will tend to be so reinserted after most, but not all, of its entrained biological product has been harvested and/or removed. By leaving a portion of the biological product in the containment bag 493, the residual biological product can grow and give rise to another harvest. If a "new" second containment bag 493 is inserted into the embodiment's inner tube 481 to replace the removed containment bag 493, then it is advantageous to first "seed" that containment bag 493 with biologic stock so that a new crop of a preferred species of algae can be grown.

In one embodiment, the cavity 460 may provide a wave induced propulsive force 473. For example, a cavity similar to any of the cavities described herein may be coupled to a lower end of the tube 453 by a constriction 454. The cavity 460 may have a lateral aperture 455 that allows for water 466 to flow 486 into and out of the WEC 450. As described herein, the controlled confinement of the water 466 produces an unbalanced force against an inner surface of the cavity 460 in order to propel the WEC 450 in a forward direction (i.e. to the left with respect to FIG. 20). In the particular embodiment shown in FIG. 20, the cavity 460 comprises an interlocking first shell 461 and second shell 462.

The scope of the present disclosure includes a complementary ship to periodically harvest the biological products grown within the embodiment, as well as the facilities on a shore, floating platform, and/or other ship where the harvested algae are processed and/or stored, as well as a method for harvesting biological products wherein: a wave energy converter of a type herein disclosed is deployed on a body of water; electrical energy produced by said wave energy converter operating in waves is used to power LEDs, or other lamps, or other sources of light emissions, that are mounted on, within, inside, or outside, of said wave energy converter, and/or LEDs, or other lamps, or other sources of light emissions, that are suspended from walls, surfaces, and/or structural members, within, inside, or outside, of said wave energy converted; biological products are permitted to grow in an enclosure, cavity, or vicinity of said wave energy converter using light from said lamps as a source of metabolic energy; said biological products (or products or byproducts produced therefrom, e.g. algal oil, fish oil, etc.) is transferred to a ship or other floating vessel; said ship or floating vessel transfers said biological products (or products or byproducts produced therefrom, e.g. algal oil, fish oil, etc.) to a shore facility for processing and/or storage.

The aquaculture configuration embodiment illustrated in FIG. 20 may also include fish within either or both of the water 470 reservoir and/or the algal containment bag 493. If one or more species of fish that are able to eat and/or consume the type(s) of algae being grown within the embodiment are selected and included within the respective growth areas prior to each growth cycle, then a portion of those fish may be harvested along with whatever algae remains uneaten. The scope of the present disclosure includes a method for harvesting fish wherein: a wave energy converter of a type herein disclosed is deployed on a body of water; electrical energy produced by said wave energy converter is used to power LEDs, or other lamps, or other sources of light emissions, that are mounted on, within, inside, or outside, of said wave energy converter, as well as LEDs, or other lamps, or other sources of light emissions, that are suspended from walls, surfaces, and/or structural members, within, inside, or outside, of said wave energy converter; algae are permitted to grow in an enclosure, cavity, or vicinity of said wave energy converter using light from said lamps as a source of metabolic energy; fish or other marine organisms are permitted to grow in an enclosure, cavity, or vicinity of said wave energy converter, feeding, at least in part, on said algae as a source of metabolic energy; said fish or other marine organisms are transferred to a ship or other floating vessel; said ship or floating vessel transfers said fish and/or other marine organisms (or products or byproducts produced therefrom, e.g. fish meal or fish oil) to a shore facility for processing and/or storage.

The scope of the present disclosure includes, but is not limited to, the growth and/or harvesting of any and every kind of microalgae, macroalgae, fish, crustacean. Fish that do not eat the varieties of algae grown may nonetheless receive nutrition, e.g. plankton and phytoplankton, from the water that is regularly introduced to the reservoir of water 470 and inner tube 481 as a result of wave action. In addition to introducing potentially nutrient-rich water from outside the embodiment into the water 470 reservoir and inner tube 481 as a result of wave action, the embodiment also tends to remove waste-containing and/or nutrient-depleted, water from the water 470 reservoir and inner tube 481 as a result of the same water cycle (i.e. water enters tube 481, and therefrom enters the water 470 reservoir, and thereafter flows out of the water reservoir through the energy generation device 477.

The scope of the present disclosure includes embodiments utilizing water reservoir lamps and/or inertial water tube lamps emitting light of any single wavelength, any range of wavelengths, and/or any combinations of wavelengths or ranges of wavelengths.

The scope of the present disclosure includes embodiments in which lamps are attached to the inner surface of the upper portion of the hollow chamber 452, i.e. within the air pocket 472. The scope of the present disclosure includes embodiments in which lamps are attached to the outer surfaces of the hollow chamber 452 and/or inner tube 481 thereby encouraging biological product growth, and the establishment of communities of fish or other marine life, outside the WEC 450, but in the vicinity of the WEC 450.

Figure 21:
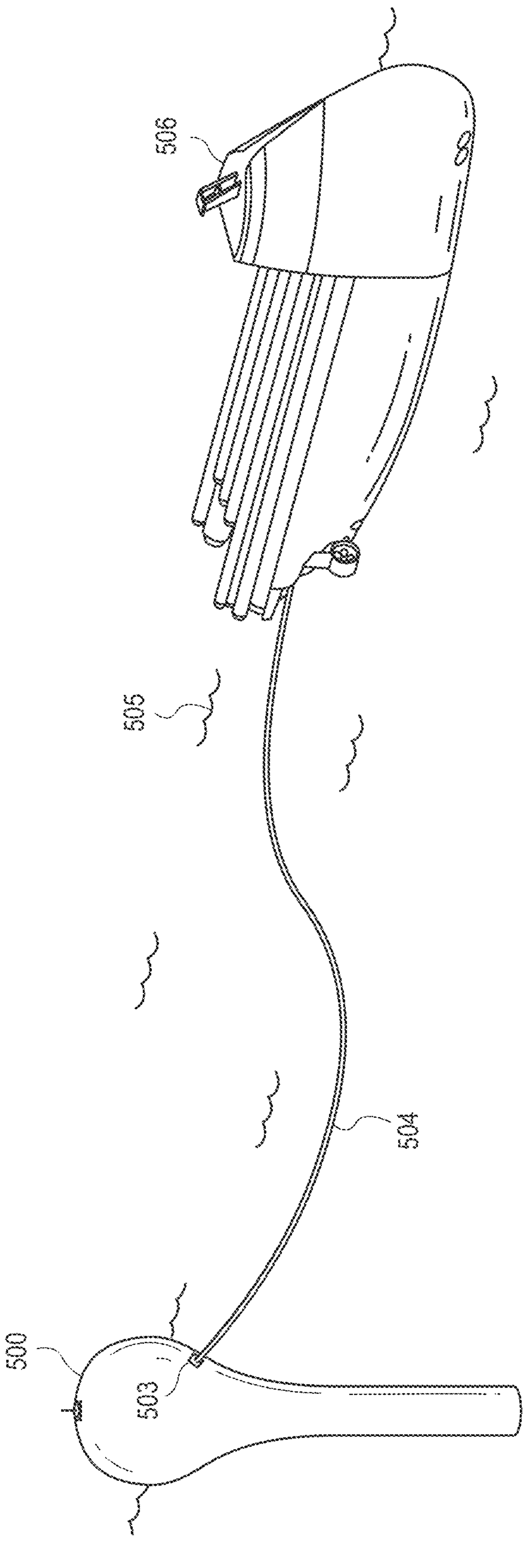
FIG. 21 is a perspective view of a system for coupling a vessel to a vessel for energy product offtake from the vessel and/or precursor delivery to the vessel, in accordance with an embodiment.

Referring now to FIG. 21 a perspective side view of a system including a WEC 500 that is fluidically coupled to a vessel 506 is shown, in accordance with an embodiment. A WEC 500 obtains, extracts, harvests, receives, and/or collects, energy from waves moving across the surface 505 of a body of water on which the WEC 500 floats. A portion of the energy that the WEC 500 extracts from the passing waves is converted into electrical power by a water turbine (not visible) and generator (not visible). A portion of the generated electrical power is used to generate an energy product (e.g., a liquid fuel, a gas fuel, a biological product, or the like). For example, a water electrolysis apparatus (not visible) inside the WEC 500 may be used for the conversion of a portion of water contained in a reservoir within the WEC 500 (not visible) into hydrogen gas. A portion of the synthesized hydrogen gas is captured within a hydrogen reservoir (not visible) within the WEC 500. The WEC 500 may comprise a lower cavity with a lateral aperture, similar to any of the cavities described in greater detail herein.

Periodically, a vessel 506 approaches the WEC 500 and positions itself near to the WEC 500. When sufficiently proximate to the WEC 500, the vessel 506 deploys a hose connection remotely-operated vehicle (hose connection ROV) 503 that is attached to a first end of a transfer hose 504. The hose connection ROV 503 pulls the transfer hose 504 to the WEC 500. The hose connection ROV 503 attaches itself translatably to the hull of the WEC 500 and moves itself across the WEC hull until it is positioned above and/or over a port (not visible) of the WEC 500. The hose connection ROV 503 then connects itself, and the attached hydrogen transfer hose, to the hydrogen port of the WEC 500 thereby permitting the energy product to be removed, and/or to flow, from the WEC 500 to the vessel 506 where it is then stored within one of more of the storage containers (not shown) of and/or on the vessel 506. In other embodiments, a passive retractable offtake system is used to couple the hose 504 to the port on the WEC 500. In some instances, the transfer of energy product from the WEC 500 to the vessel 506 is passive (e.g., if a pressure differential drives product from the WEC 500 to the vessel 506). In other instances, a pump, winch, or other mechanical force can be used to actively transport energy product from the WEC 500 to the vessel 506.

The vessel 506 in FIG. 21 is shown as a boat, but it is to be appreciated that any suitable transport vehicle may be used to offload energy product from the WEC 500. For example, a submersible vehicle, an aerial vehicle (e.g., helicopter, plane, dirigible airship, drone, etc.), or the like may also be used to offload energy product from the WEC 500. In an embodiment, the vessel 506 may transport the energy product directly to the shore, or the vessel 506 may be an intermediate transport that delivers the energy product to a second vessel, or a platform within the body of water on which the WEC 500 floats.

Figure 22:
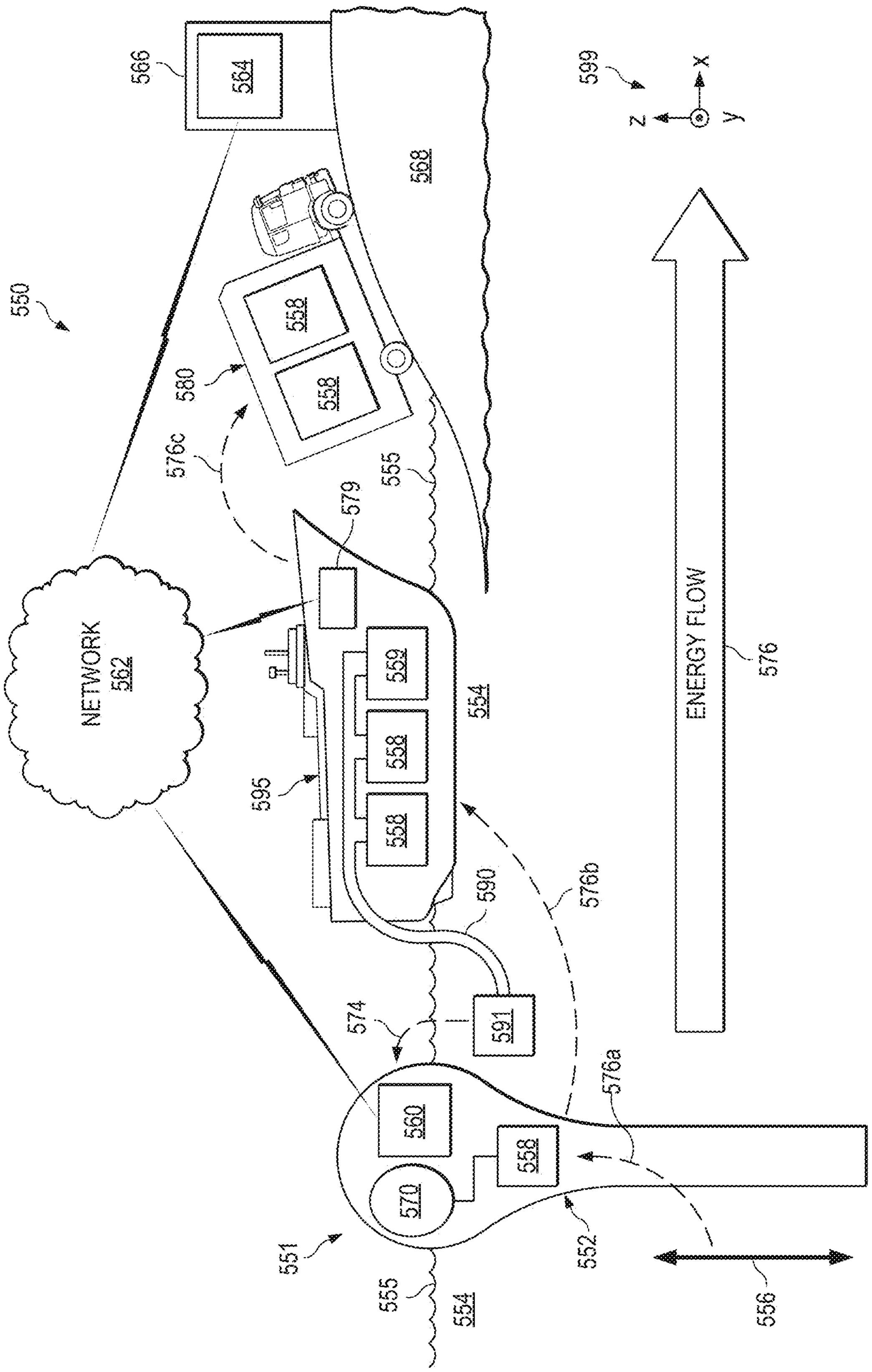
FIG. 22 is a schematic view of an energy flow diagram depicting the generation and transfer of energy products from the vessel to shore, in accordance with an embodiment.

Referring now to FIG. 22, a schematic diagram of a wave energy harvesting system 550 is shown. The wave energy harvesting system 550 may include a first free-floating body 551 and a second free-floating body 595 which may transiently couple to one another while floating on a surface 555 of a body of water 554. In an example embodiment, the first free-floating body 551 may be configured as a wave engine 551 (e.g., a WEC or hydrodynamic pump with a cavity with a lateral aperture, such as those described herein) and the second free-floating body 595 may be a storage vessel 595, such as a tanker ship 595. In some embodiments, the wave engine 551 may include a receiving port 570 operable to receive a conduit assembly 591 (as indicated by arrow 574) that is in fluidic communication with a conduit 590 from the storage vessel 595 and thereby fluidly couple the wave engine 551 to the storage vessel 595 via the conduit 590 for transfer of one or more fluids therebetween. While fluidic communication and coupling between the wave engine 551 and the storage vessel 595 is described in greater detail with respect to FIG. 22, it is to be appreciated that non-fluid products may also be transmitted between the wave engine 551 and the storage vessel 595.

In an embodiment, the fluidic communication (or fluidic coupling) between the wave engine 551 and the storage vessel 595 may be enabled through the use of automated, autonomous, and/or passive systems. In some embodiments, for instance, the conduit assembly 591 may include one or more fluid nozzles (not shown at FIG. 22) operable to emit one or more fluid streams to direct the conduit assembly 591 to the receiving port 570.

A set of Cartesian coordinate axes 599 is shown in FIG. 22 for contextualizing positions of the various components of the wave energy harvesting system 550. Specifically, x-, y-, and z-axes are provided which are mutually perpendicular to one another, where the x- and z-axes define a plane of the schematic diagram shown in FIG. 22 and the y-axis is perpendicular thereto. In some embodiments, a direction of gravity may be parallel to and coincident with a negative direction of the z-axis.

Though exemplified herein in the context of wave engines, the first free-floating body 551 may be configured as any free-floating body capable of self-propulsion, e.g., by extracting energy from stored fuel, inducing a flow of pressurized water, and/or harnessing one or more ambient environmental forces (e.g., using a cavity with a lateral aperture), so as to translate along the surface 555 of the body of water 554. For example, the first free-floating body 551 may be a ship (such as a deployment ship, a tanker ship or other storage vessel, or another transport vessel), a buoy, a wind turbine, an offshore platform, such as a data center, etc.

In embodiments where the first free-floating body 551 is configured as the wave engine, water may pass into and through the wave engine with upward and downward motion 556 (e.g., in a positive direction of the z-axis and the negative direction of the z-axis, respectively) of water waves. As described in greater detail herein, the upward and downward motion 556 may induce the water passing into and through the wave engine 551, energy from 5 which may be captured and converted to an energy product 558 (as indicated by a dashed arrow **576*a*). The energy product 558**, for example, may include one or more of an electrolysis product or other fuel/chemical, such as $H_2$ gas, HCl, etc., removed carbon, minerals, a biological product, digital goods, or an executed computational algorithm, such as, but not limited to a proof-of-work mechanism for a cryptocurrency, a trained machine learning algorithm, or the like.

In some embodiments, the first free-floating body 551 may include a first onboard controller or other computing device 560 and/or the second free-floating body 595 may include a second onboard controller or other computing device 579, the first and second onboard controllers 560, 579 each including non-transitory memory on which executable instructions may be stored. The executable instructions may be executed by one or more processors of the first and second onboard controllers 560, 579 to respectively perform various functionalities of the first and second free-floating bodies 551, 595. Accordingly, the executable instructions may include various routines for operation, propulsion, maintenance, tracking, and testing of the first and second free-floating bodies 551, 595. The first and second onboard controllers 560, 579 may be communicably coupled to various components (e.g., valves, power supplies, etc.) of the first and second free-floating bodies 551, 595 to command actuation and use thereof (wired and/or wireless communication paths between the first and second onboard controllers 560, 579 and the various components are omitted from FIG. 22 for clarity). For instance, the first onboard controller 560 may command actuation of one or more first coupling elements annularly distributed on the receiving port 570 and the second onboard controller 579 may command actuation of one or more second coupling elements annularly distributed on the conduit assembly 591 so as to selectively engage and disengage the one or more first coupling elements with one or more second coupling elements (first and second coupling elements not shown at FIG. 22). Though, it is to be appreciated that passive self-alignment may be enabled through the use of a retractable offtake system.

In certain embodiments, the first and second onboard controllers 560, 579 may be communicably coupled to a remote controller or computing device 564 via a wireless network 562. The various controllers 560, 564, 579 may be configured in a substantially similar manner to one another, excepting, in some examples, one or more modifications or differences for a given use case. For example, the remote controller 564 may be positioned so as to be accessible to an operator of the wave energy harvesting system 550, e.g., on a ship or in a physical structure 566 on land 568 (as illustrated in FIG. 22). As such, even when one or both of the first and second free-floating bodies 551, 595 are not geographically located within a national or subnational jurisdiction, the one or both of the first and second free-floating bodies 551, 595 may nevertheless be in continuous (e.g., substantially uninterrupted) or periodic communication with the remote controller 564 which may be geographically located within a national or subnational jurisdiction (e.g., on the land 568).

In some embodiments, because the remote controller 564 may be configured for use by the operator, the remote controller 564 may include a user interface at which the operator may enter commands or otherwise modify operation of the wave energy harvesting system 550. The user interface may include various components for facilitating operator use of the wave energy harvesting system 550 and for receiving operator inputs (e.g., requests to direct the conduit assembly 591 to the receiving port 570), such as one or more displays, input devices (e.g., keyboards, touchscreens, computer mice, depressible buttons, mechanical switches, other mechanical actuators, etc.), lights, etc. In additional or alternative embodiments, one or both of the first and second onboard controllers 560, 579 may be configured with the user interface as described hereinabove.

An overall energy flow 576 of the wave energy harvesting system 550 is schematically depicted in FIG. 22, in which energy captured at the first free-floating body 551 from water induced therethrough by the upward and downward motion 556 of the water waves (as indicated by the dashed arrow 576*a*) may be converted to the energy product 558 and transferred to the second free-floating body 595 (as indicated by a dashed arrow 576*b*) and then transferred from the second free-floating body 595 to a land-based vehicle 580 (as indicated by a dashed arrow 576*c*) to be transported to a storage facility and/or an end user for consumption. For example, in some embodiments, the wave energy harvesting system 550 may include a plurality of nodes including a plurality of first free-floating bodies 551, one or more second free-floating bodies 595 to transport a plurality of energy products 558 from the plurality of first free-floating bodies 551 to the land 568, and one or more land-based vehicles 580 to transport the plurality of energy products 558 from the one or more second free-floating bodies 595 to the storage facility and/or the end user. In other instances, the energy products 558 may be directly transported from the second free-floating body 595 to a storage facility and/or end user on the land 568 or within a certain distance of the land 568 (e.g., up to 100 kilometers from land, up to 40 kilometers from land 568, up to 1 kilometer from land 568, up to 500 meters from land 568, or up to 50 meters from land 568). Though storage facilities or consumption locations may be further from land in other embodiments.

In an example embodiment, the energy product 558 may be a fluid (e.g., a liquid or a gas) which is transferred from the first free-floating body 551 to the second free-floating body 595 via the conduit 590, the conduit 590 being configured to transiently fluidly couple an internal reservoir of the second free-floating body 595 to an internal reservoir of the first free-floating body 551 via one or more internal passages extending at least a length of the conduit 590 (internal reservoirs and internal passage(s) not shown at FIG. 22). In certain embodiments, the conduit 590 may include a plurality of internal passages, each of which may convey a different fluid between the first and second free-floating bodies 551, 595. As an example, the conduit 590 may include a first internal passage configured to supply an energy product precursor 559 (e.g., an electrolysis reactant, such as deionized water) from the second free-floating body 595 to the first free-floating body 551 so as to replace the energy product 558 being transferred to the second free-floating body 595. Accordingly, in such an example, the conduit 590 may further include a second internal passage configured to siphon the energy product 558 (e.g., an electrolysis product, such as hydrogen gas) from the first free-floating body 551 to the second free-floating body 595. As such, the overall energy flow 576 may be maintained by periodically (e.g., once per week) replenishing a capacity of the first free-floating body 551 to convert captured energy into a chemical energy product.

In some embodiments, the adjustments to the position of the conduit assembly 591 may be executed based on a manual operator input, e.g., at the user interface of the remote controller 564. In additional or alternative embodiments, the adjustments to the position of the conduit assembly 591 may be automatically adjusted, e.g., based on feedback from one or more sensors and/or data received via the wireless network 562. As an example, one or both of the first and second free-floating bodies 551, 595 may include an accelerometer (e.g., an inertial measurement unit; not shown) configured to gather changes in local positional data, e.g., resulting from water wave motions. As an additional or alternative example, one or both of the first and second free-floating bodies 551, 595 may include a global positioning system (not shown) configured to gather geographic positional data. As an additional or alternative example, one or both of the first and second free-floating bodies 551, 595 may include a wind speed sensor (not shown) configured to measure wind speed. As an additional or alternative example, such data (e.g., the positional data and/or the wind speed) may be received via the wireless network 562, in addition to other data such as meteorological data (e.g., water wave height, direction of water wave propagation, water wave period, weather, etc.). In some embodiments, directions and magnitudes of applied forces may be inferred based on the feedback from the one or more sensors and/or the data received via the wireless network 562, such that specific operational parameters (e.g., the one or more continuously adjustable parameters) may be adjusted responsive such that changes in individual applied forces may be accounted for with specificity. Though, the use of a passive retractable offtake system may allow for a more passive and precise fluidic coupling between the free-floating bodies 551 and 595, even in the view of wave conditions, wind conditions, or other environmental factors.

Figure 24:
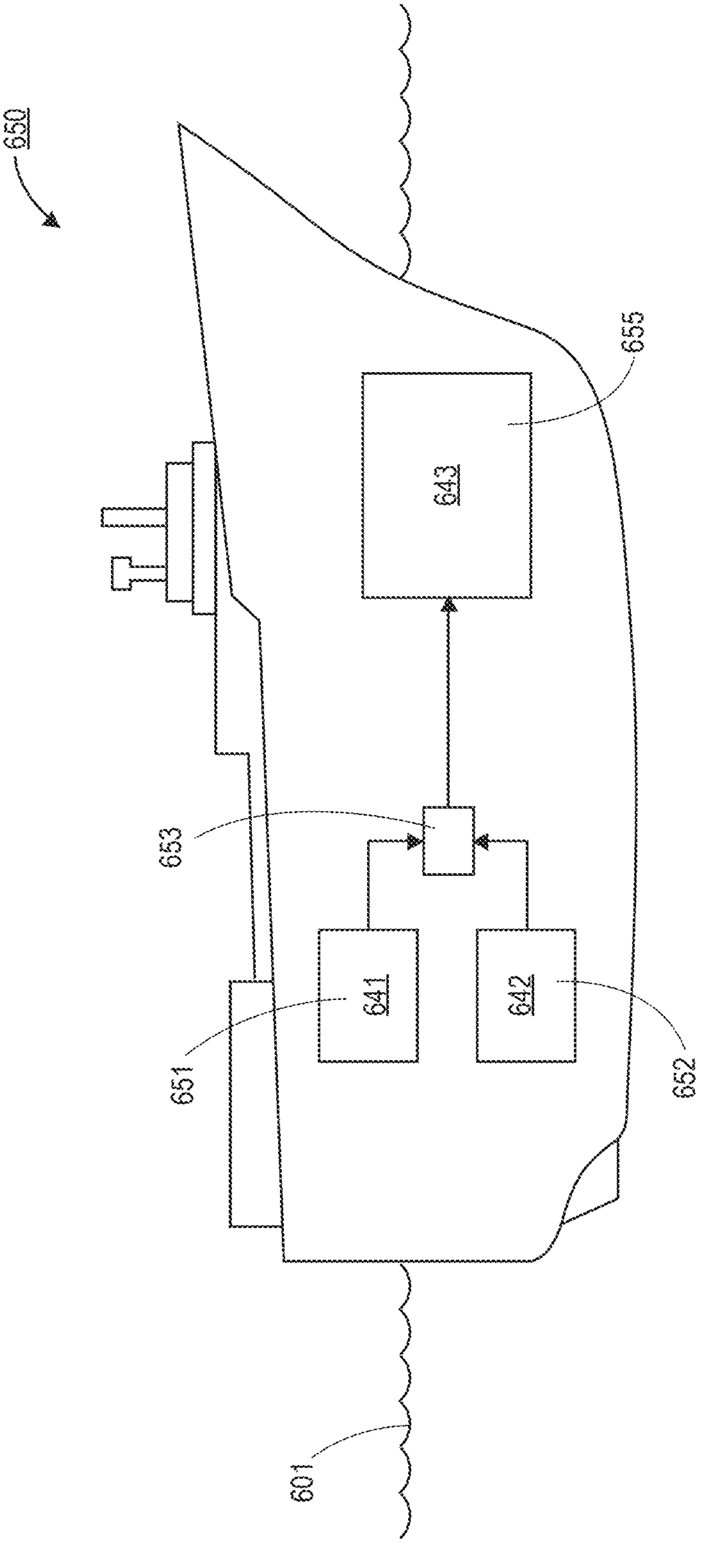
FIG. 24 is a schematic view of an energy product conversion plant integrated on a transport vessel, in accordance with an embodiment.
Figure 25:
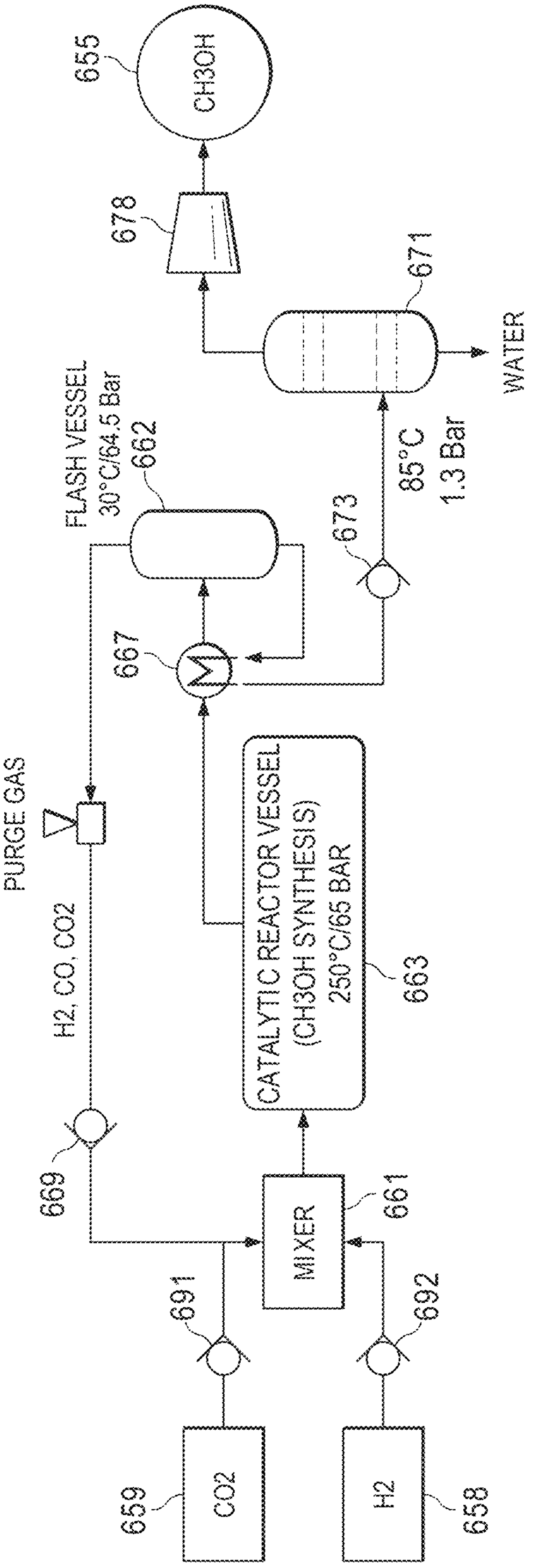
FIG. 25 is a schematic of an energy product conversion process, in accordance with an embodiment.

In the embodiment shown in FIG. 22, the energy product 558 is generated at the first free-floating body 551 and subsequently transported to land 568. That is, the energy product 558 may not undergo any subsequent processing after it has been produced. However, in other embodiments, the energy product 558 may be further processed in order to generate an alternative product before reaching land 568 (or near land). For example, the initial energy product 558 may be filtered, compressed (e.g., from gas to liquid), used in a reaction as a precursor, or otherwise processed before reaching land 568 or near land. For example, hydrogen gas may be used as a precursor in order to generate a more energy dense substance or fuel, such as methanol, or algae can be processed into algae oil. These processing operations may be implemented on the first free-floating body 551, on the second free-floating body 595, or on a combination of both the first free-floating body 551 and the second free-floating body 595. Examples of such processing are shown in FIG. 23-25.

Figure 23:
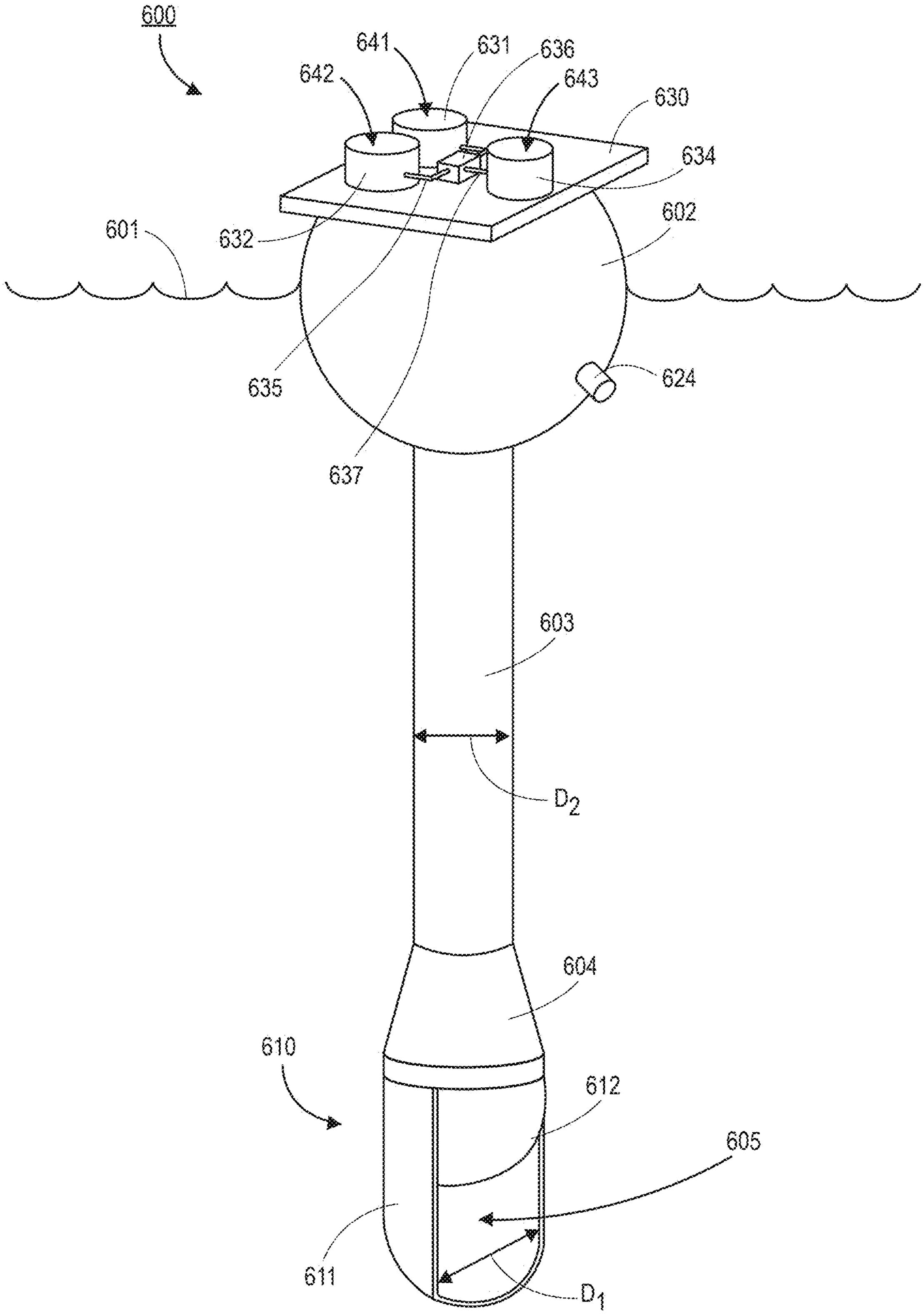
FIG. 23 is a side perspective view of a vessel with a cavity with a lateral aperture with an energy product conversion plant integrated on the vessel, in accordance with an embodiment.

Referring now to FIG. 23 a side perspective view of an WEC 600 with a lower cavity 610 that has a lateral aperture 605 and an integrated processing plant on a platform 630 is shown, in accordance with an embodiment. The WEC 600 floats adjacent to an upper surface of a body of water 601 over which waves tend to pass. The WEC 600 comprises a hollow buoyant chamber 602, and/or buoy. In an embodiment a tube 603 is coupled to the buoyant chamber 602.

In an embodiment, the cavity 610 is coupled to the tube 603 by a constriction 604. The cavity 610 may be similar to any of the cavities described in greater detail herein. For example, the cavity 610 may include interlocking shells 611 and 612 in order to confine and direct the flow of water in order to generate a propulsive thrust for the WEC 600. In an embodiment, a width of the aperture 605 (i.e., a first width $D_1$) is greater than a minimum width of the tube 603 (i.e., a second width $D_2$).

As described in other embodiments, an energy product 641 may be generated by way of conversion of wave energy into electrical power. For example, water flowing out of effluent tube 624 may drive engage a generator (not shown) within the effluent tube 624. In some embodiments, the energy product 641 may be a gas or other fluid, such as hydrogen gas. The energy product 641 may be stored in a first storage container 631. WEC 600 depicts the first storage container 631 for the energy product 641 being on the platform 630. Though other implementations may include the first storage container 631 being integrated into the hollow chamber 602, being external to the WEC 600 (e.g., being attached or otherwise coupled to an external surface of the WEC 600), or positioned in the approximate area of the WEC 600 (e.g., on a second floating platform that is at least temporarily coupled to the WEC 600).

In an embodiment, the energy product 641 in the first storage container 631 may be used as a precursor for a chemical reaction. In an additional embodiment, a second precursor 642 may be stored in a second storage container 632. In the instance of a chemical reaction to convert hydrogen gas into methanol, the second precursor 642 may comprise $CO_2$ or another carbon containing source. The second precursor 642 may also be generated as an energy product on the WEC 600, or the second precursor 642 may be periodically replenished by a vessel, or the like. The energy product 641 may flow from the first storage container 631 into a reaction apparatus 636 through pipe 636, and the second precursor 642 may flow from the second storage container 632 into the reaction apparatus 636 through pipe 635. The reacted product 643 (e.g., a second energy product) may flow through pipe 637 into a third storage container 634. The reacted product 643 may be periodically removed from the third storage container 634 for transport to an alternative location (e.g., another storage location or use facility, either on the body of water 601 or on land). While a simple reaction process is shown in FIG. 23, it is to be appreciated that any suitable conversion, filtering, compression, reaction, treatment, or the like may be implemented on the WEC 600.

Referring now to FIG. 24 a side view schematic of a vessel 650 that may be used to transport an energy product from a WEC with a cavity with a lateral aperture (not shown) to land (not show) is shown. For example, vessel 650 may be similar to the second free-floating body 595 in FIG. 22: the vessel 650 may include a first storage container 651 for storing an energy product 641. The energy product 641 may be transported into the first storage container 651 from a WEC, or from another vessel (not shown) that obtained the energy product 641 from a WEC. For example, the energy product 641 may comprise hydrogen or any other energy product described in greater detail herein: the vessel 650 may also comprise a second storage container 652 for storing an additional precursor 642. In the case of hydrogen to methanol conversion, the additional precursor 642 may comprise carbon (e.g., $CO_2$). In an embodiment, the energy product 641 and the precursor 642 are flown into a reaction apparatus 653. The combined energy product 641 and precursor 642 may react in the reaction apparatus 653 to form a reacted product 643 that is transported to a third storage container 666. The reacted product 643 may be transported by the vessel 650 to an alternative storage or use facility (either on land or on the water 601). While a simple reaction process is shown in FIG. 24, it is to be appreciated that any suitable conversion, filtering, compression, reaction, treatment, or the like may be implemented on the vessel 650.

Referring now to FIG. 25 a diagram providing a more detailed explanation of a reaction process that may be used to convert a first energy product into a second energy product is shown, in accordance with an embodiment. The conversion depicted in FIG. 22 can be implemented on a WEC (e.g., similar to FIG. 23), on a transport vessel (e.g., similar to FIG. 24), partially on the WEC and partially on the transport vessel, or partially on a first transport vessel and partially on a second transport vessel. In the embodiment shown in FIG. 25, a detailed process by which methanol ($CH_3OH$) is synthesized from, by, and/or through, $CO_2$ hydrogenation is shown. In an embodiment, $CO_2$ is stored in $CO_2$ tank 659 and $H_2$ is stored in $H_2$ tank 658. One or both of the $CO_2$ and the $H_2$ may be energy products generated by a WEC with a lateral aperture. The $CO_2$ and $H_2$ are pumped with pump 691 and pump 692 and combined in a mixer 661 with a recirculated stream from flash vessel 662. The mixed stream (of $CO_2$ and $H_2$ gases) is pumped to a catalytic reactor vessel 663 where an exothermic reaction takes place, and the temperature and pressure can reach 250° C. and 65 bar, respectively, or higher. The post-reaction stream exits the catalytic reactor vessel 663 and passes through heat exchanger 667 and then enters flash vessel 662 where the temperature and pressure will be approximately 30.0° C. and 64.5 bar, respectively.

A stream of $H_2$, CO and $CO_2$ from flash vessel 662 is recirculated back to mixer 661 by pump 669 after being purged of a small amount of gas to further purify the stream. The liquid stream from flash vessel 662 enters heat exchanger 667 which is then pumped to distillation tower 671 by pump 673. The crude $CH_3OH$ stream entering distillation tower 671 can be at a temperature and pressure of 85° C. and 1.3 bar, respectively. A final separation of $CH_3OH$ and water takes place within distillation tower 671. Gaseous $CH_3OH$ is pumped to methanol ballast sphere 655 via a compressor pump 678 where the $CH_3OH$ is cooled to liquefaction. Water extracted from the crude aqueous $CH_3OH$ is released from a bottom of the distillation tower 671. Other processes for synthesizing methanol from $CO_2$ and $H_2$ are known in the prior art and can be used in place of the one shown. Embodiments utilizing, incorporating, and/or including, such other methanol synthesis processes and/or associated mechanism and equipment are included within the scope of the present disclosure. Further, while methanol synthesis is provided as one example, conversion or reaction of any energy products using any suitable chemical reactions, processes, treatments, filtering, or the like may be used.

In the several of the previous embodiments, while energy products are defined as being physical items (e.g., fuels, chemicals, biological goods, etc.), embodiments are not limited to such configurations. For example, electrical power derived by a WEC described herein may be used to power one or more computational systems. These systems may be used in order to provide computational work that has a monetary or social value. For example, computational work can be used to host a data center, implement block-chain mining, training machine learning (ML) or artificial intelligence (AI) algorithms, or the like. An example of such a system is provided in FIG. 26.

Figure 26:
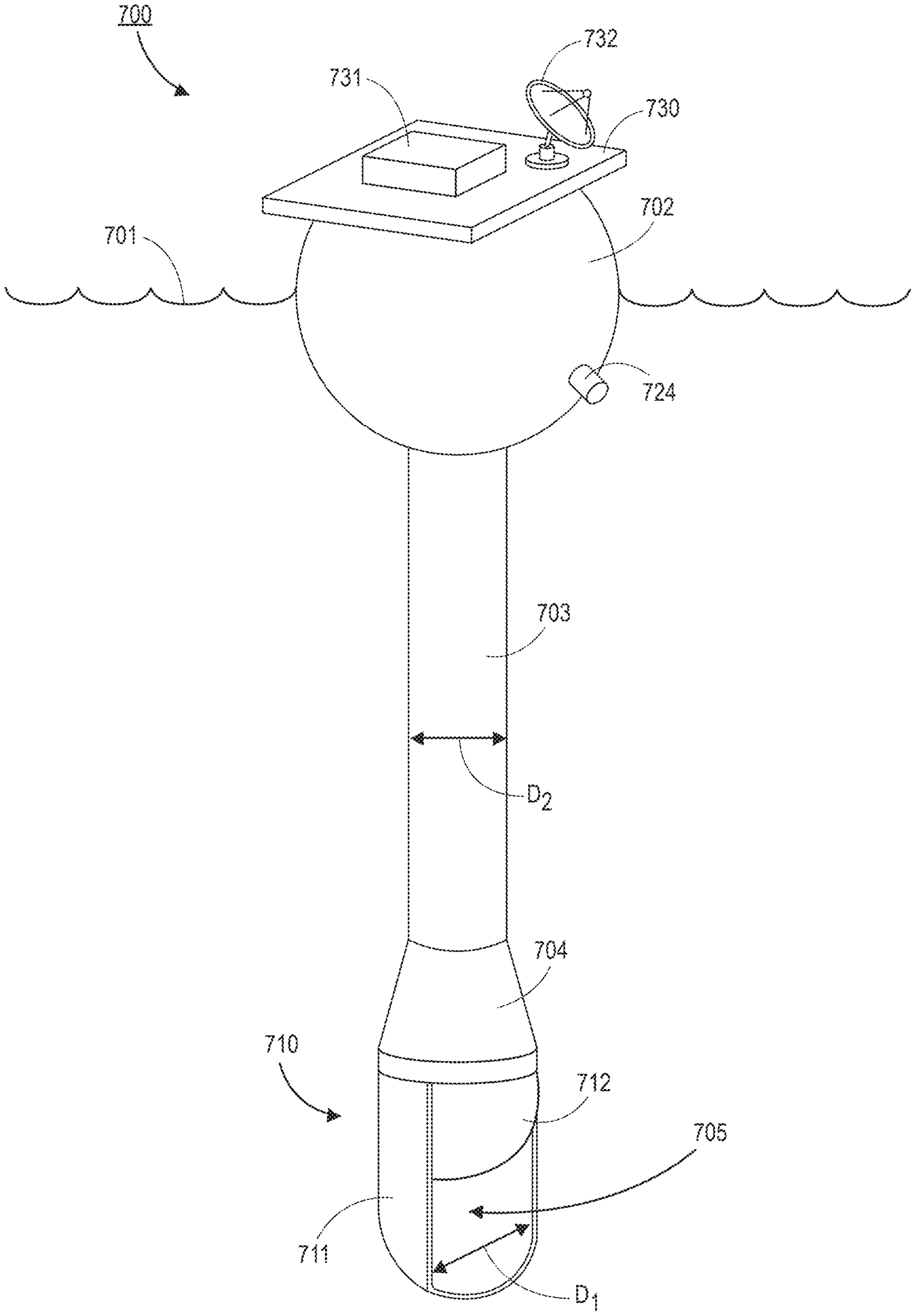
FIG. 26 is a side perspective view of a vessel with a cavity with a lateral aperture with a computing system integrated on the vessel, in accordance with an embodiment.

Referring now to FIG. 26 a side perspective view of a WEC 700 with a lower cavity 710 that has a lateral aperture 705 with an integrated computing system 731 on a platform 730 at the top of the WEC 700 is shown, in accordance with an embodiment. The WEC 700 floats adjacent to an upper surface 701 of a body of water over which waves tend to pass. The WEC 700 comprises a hollow buoyant chamber 702, and/or buoy. In an embodiment a tube 703 is coupled to the buoyant chamber 702.

In an embodiment, the cavity 710 is coupled to the tube 703 by a constriction 704. The cavity 710 may be similar to any of the cavities described in greater detail herein. For example, the cavity 710 may include interlocking shells 711 and 712 in order to confine and direct the flow of water in order to generate a propulsive thrust for the WEC 700. In an embodiment, a width of the aperture 705 (i.e., a first width $D_1$) is greater than a minimum width of the tube 703 (i.e., a second width $D_2$).

As described in other embodiments, an energy product may be generated by way of conversion of wave energy into electrical power. For example, water flowing out of effluent tube 724 may drive engage a generator (not shown) within the effluent tube 724. In some embodiments, the energy product may be a gas or other fluid, such as hydrogen gas. In some instances, the energy product may be used in order to operate a computing system 731. In an embodiment, a platform 730 may be provided over a top of the buoyant chamber 702. The computing system 731 may be provided on the platform and include an enclosure to protect components from water and the elements. Any number of computational systems (e.g., processors, graphics processors, etc.), memories, and/or the like may be housed within the enclosure. The computing system 731 may be configured with a plurality of processing systems integrated with each other in order to perform complex computer processing operations. As noted above, the computing system 731 may be optimized and/or configured to implement one or more of data center hosting, implementing block-chain mining, training ML or AI algorithms, or the like. The outcome of the computational work (e.g., block-chain coins or tokens, trained algorithms, data center capacity, etc.) can be transmitted to external devices over a wireless network through one or more antennas 732, or other wireless systems. As noted above, the computing system may be powered by energy generated by the WEC 700 through conversion of wave energy into electrical power, or through conversion of the energy product stored in a chamber back into electrical power (e.g., through the use of a hydrogen fuel cell or the like).

Figure 27:
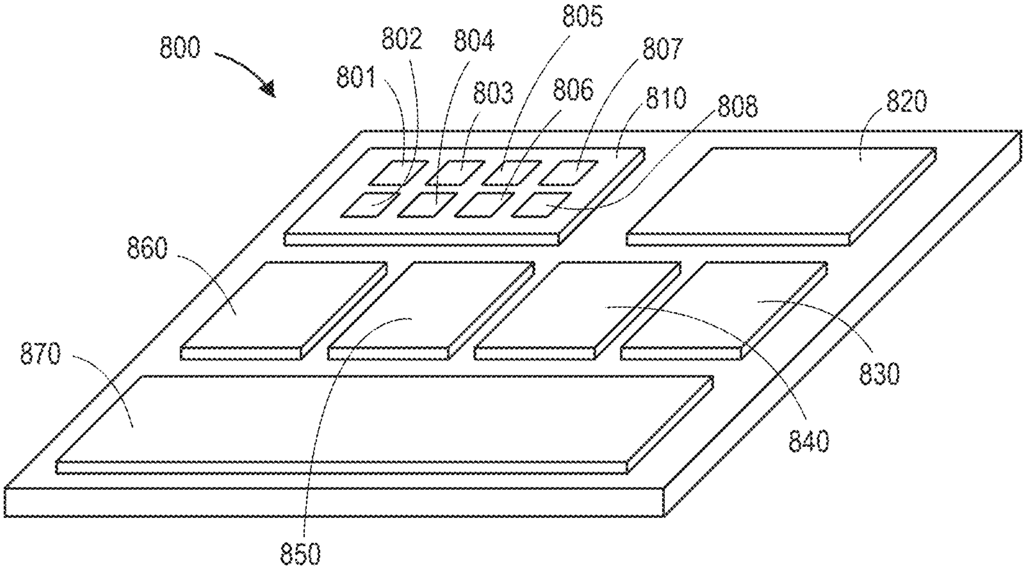
FIG. 27 is a perspective view of a computing system that can be integrated with a vessel with a cavity with a lateral aperture, in accordance with an embodiment.

Referring now to FIG. 27 a perspective view of a computing system 800 that may be integrated with a WEC with a lateral aperture, such as those described in greater detail herein, is shown, in accordance with an embodiment. The computing system 800 may comprise an array of electronics, hardware, and/or software that are configured to control one or more aspects of the wave-energy generation device. While the components illustrated in FIG. 27 are shown on a single board, it is to be appreciated that components may be on separate boards, structures, or the like. The computing system 800 may be housed within a watertight chamber or enclosure provided on the WEC.

Computing system 800 may comprise a computing device 810. The computing device 810 houses a board. The board may include a number of components, including but not limited to a processor 801. The processor 801 may include, but is not limited to, a central processing unit (CPU), a graphics processing unit (GPU), an application-specific integrated circuit (ASIC), a field programmable gate array (FPGA), and/or the like. The processor 801 is physically and electrically coupled to the board. Other components of computing device 810 include, but are not limited to, one or more memories 802 or 803, such as volatile memory (e.g., DRAM), non-volatile memory (e.g., ROM), flash memory, a mass storage device (such as hard disk drive, compact disk (CD), digital versatile disk (DVD), and so forth). The computing device may comprise a communications chipset 804, a digital signal processor 805, a chipset 806, an antenna 807, and/or an input/out device 808.

Computing system 800 may comprise a communications device 820. The communications device 820 enables wireless communications for the transfer of data to and from the computing system 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communications device 820 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing system 800 may include a plurality of communications devices 820. For instance, a first communications device 820 may be dedicated to shorter range wireless communications such as Wi-Fi and Bluetooth and a second communications device 820 may be dedicated to longer range wireless communications such as GPS, EDGE, GPRS, CDMA, WiMAX, LTE, Ev-DO, and others. The communications device 820 may be communicatively coupled to one or more antennas, satellite dishes, or other device to broadcast and/or receive wireless communications. The antennas or the like may be external to the enclosure, or the antennas may be within the enclosure.

Computing system 800 may also comprise a server rack 830. The server rack 830 may comprise a plurality of processors with associated hardware and software. The server rack 830 may execute computational work in order to provide a revenue generating service. The server rack 830 may be powered through energy generated by the WEC, such as those described in greater detail herein. While a constant power supply may be desired, computing system 800 may still function with an intermittent or non-constant power supply provided by wave-energy generation. To deal with the variable power supply, server rack 830 may include controllers that adjust clock speed for the processors. This allows for power consumption to be directly controlled to coincide with available power. In some instances, the server rack 830 may perform data center operations or tasks. The server rack 830 may host and/or deliver content, or otherwise provide a link between consumers and centralized data storage. In some instances, the server rack 830 may perform services in conjunction with block-chain technologies, such as cryptocurrency mining. The server rack 830 may perform services such as ML or AI training as well.

Computing system 800 may include a positioning system 840. The positioning system 840 may include one or more modules, components, and/or apparatuses for determining a geolocation of the wave-energy generation device. In some instances, the positioning system 840 may comprise a GPS, a compass, an accelerometer, a gyroscope, and/or the like. The positioning system 840 may include a processor and/or controller to enable navigation for the wave-energy generation device. For example, actuators may be controlled in order to steer or direct the wave-energy generation device in a particular direction. Propulsion devices (e.g., propellers, water get flows, etc.) on the WEC may also be powered and/or directed by components of the positioning system 840.

Computing system 800 may include a sensor module 850. The sensor module 850 may include processors, memory, and associated hardware and software to control and/or record data from one or more sensors that monitor various aspects of the WEC. Sensors may comprise, but are not limited to, a pressure sensor, a gas composition sensor, a water level sensor, a temperature sensor, a fluid flow rate sensor, an electrical current sensor, a power sensor, a camera, an optical sensor, or the like. The physical sensors may be distributed throughout the WEC, and the controlling circuitry/software may be provided in the sensor module 850 within the computing system 800.

Computing system 800 may include an interface module 860. The interface module 860 may comprise one or more components used to interface with the wave-energy generation device. The interface module 860 may include one or more input devices. For example, a keyboard, a mouse, a touchscreen display, or the like may be provided in the interface module 860. Output devices, such as a display screen, a speaker, or the like may also be provided in the interface module 860. The interface module 860 may further comprise a camera, a video camera, a biometric screening device, or the like.

Computing system 800 may include a battery module 870. The battery module 870 may include any type of battery. The battery may include a rechargeable battery, such as a lithium-based battery (e.g., a lithium-ion battery). The battery of the battery module 870 may be charged by electricity generated by the WEC. The battery module 870 may be used as a store of power in order to power one or more electrical components of the computing system 800, or any other powered device of the wave-energy generation device. The battery module 870 may be used in order to normalize power delivery to electrical components. For example, the battery module may supply power in order to equalize total power delivery when the wave-energy generation device provides variable power over time.

Figure 28:
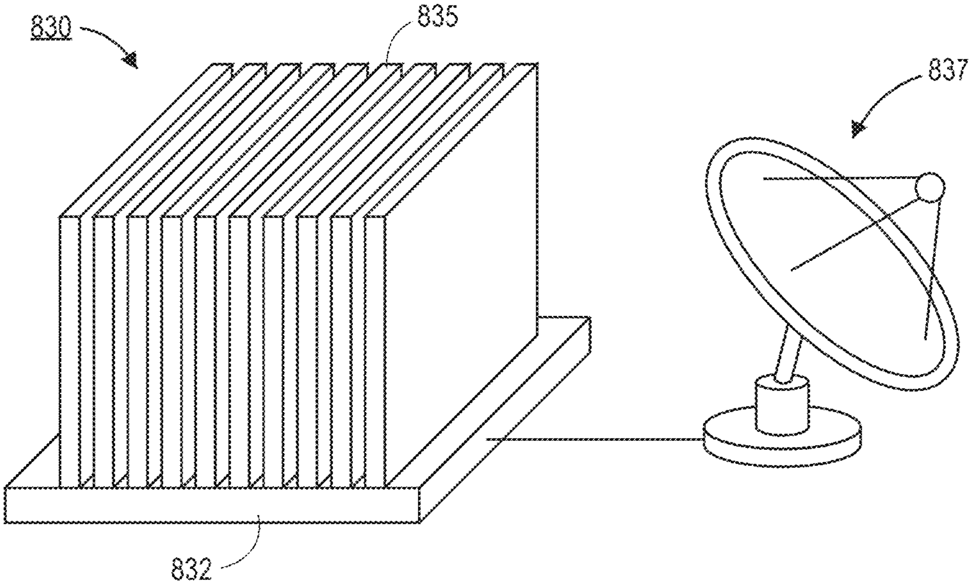
FIG. 28 is a perspective view of a server system that can be integrated with a vessel with a cavity with a lateral aperture, in accordance with an embodiment.

Referring now to FIG. 28 a perspective view of a server rack 830 that may be integrated into a WEC with a lateral aperture, such as those described in greater detail herein, is shown, in accordance with an embodiment. As shown, the server rack 830 may include a plurality of server blades 835 that are provided on a rack 832. The server blades 835 may be communicatively coupled to each other through the rack 832 and/or associated cabling, in order to provide enhanced processing power. The server blades 835 may include processors, such as, but not limited to, central processing units (CPUs), graphics processing units (GPUs), application-specific integrated circuits (ASICs), field programmable gate arrays (FPGAs), and/or the like.

In some instances, the server rack 830 is communicatively coupled to an antenna 837 to enable wireless communication. The antenna 837 may include a parabolic dish antenna or any other antenna configuration. The ability to wirelessly transmit data from the server rack 830 allows for data to be processed remotely at the source of power generation (e.g., in the ocean) while still being useful to the end consumer. The data delivery, hosting, computation, and the like can be executed at lower energy costs using such wave-energy generation devices. Further, the server rack 830 can be passively cooled by the body of water surrounding the wave-energy generation device (e.g., the server rack 830 can be in a watertight enclosure that is submersed in water). In some instances, the server rack 830 functions as a cryptocurrency mining rig that is powered through the energy produced by the WEC.

Figure 29:
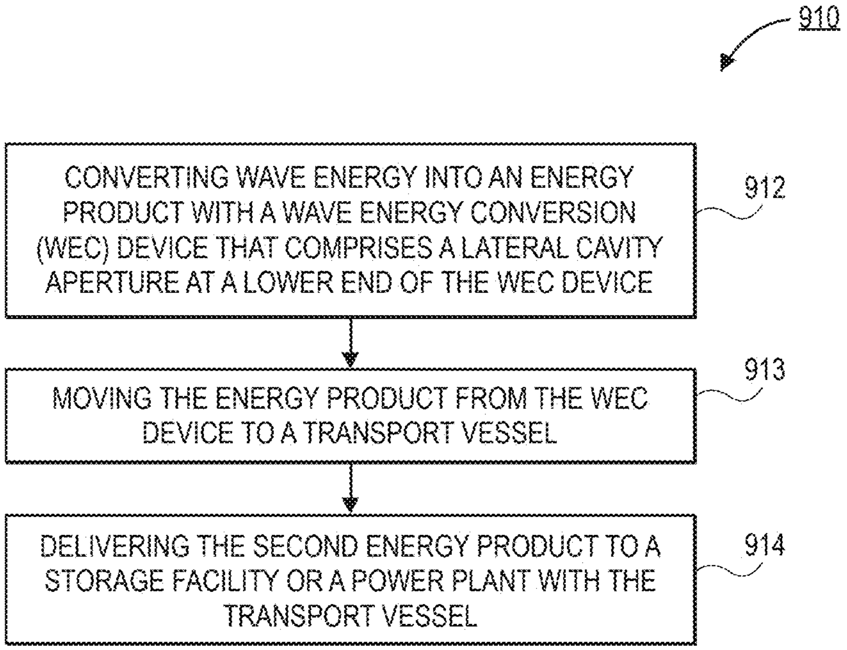
FIG. 29 is a process flow diagram of a process for generating an energy product with a vessel with a cavity with a lateral aperture and transporting the energy product to a second vessel, in accordance with an embodiment.

FIG. 29 is a process flow diagram of a process 910 for generating an energy product with a WEC and transporting the energy product to an alternative location is shown in accordance with an embodiment. In an embodiment, the process 910 may begin with operation 911, which comprises converting wave energy into an energy product with a WEC that comprises a lower cavity with a lateral aperture. The WEC may be similar to any of the WECs described in greater detail herein. The energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the energy product may be made using any process described herein. For example, electrical power generated by the WEC can be used in order to produce the energy product.

In an embodiment, the process 910 may continue with operation 912, which comprises moving the energy product from the WEC to a transport vessel. The transport vessel may be similar to any vessel described herein. For example, the transport vessel may comprise a boat, a submersible, an aerial vehicle, or any other vessel that is capable of controlled motion on, through, and/or over the body of water on which the WEC floats. The energy product may be delivered or moved (actively or passively) to the transport vessel through any mechanism, such as a hose, a pipe, a cable, or the like.

In an embodiment, the process 910 may continue with operation 913, which comprises moving the energy product to a storage facility or a power plant with the transport vessel. The storage facility or a power plant may be provided at a location that is different than an approximate location of the WEC. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the energy product from the WEC and deliver it to the second vessel. The second vessel may then take the energy product towards shore.

Figure 30:
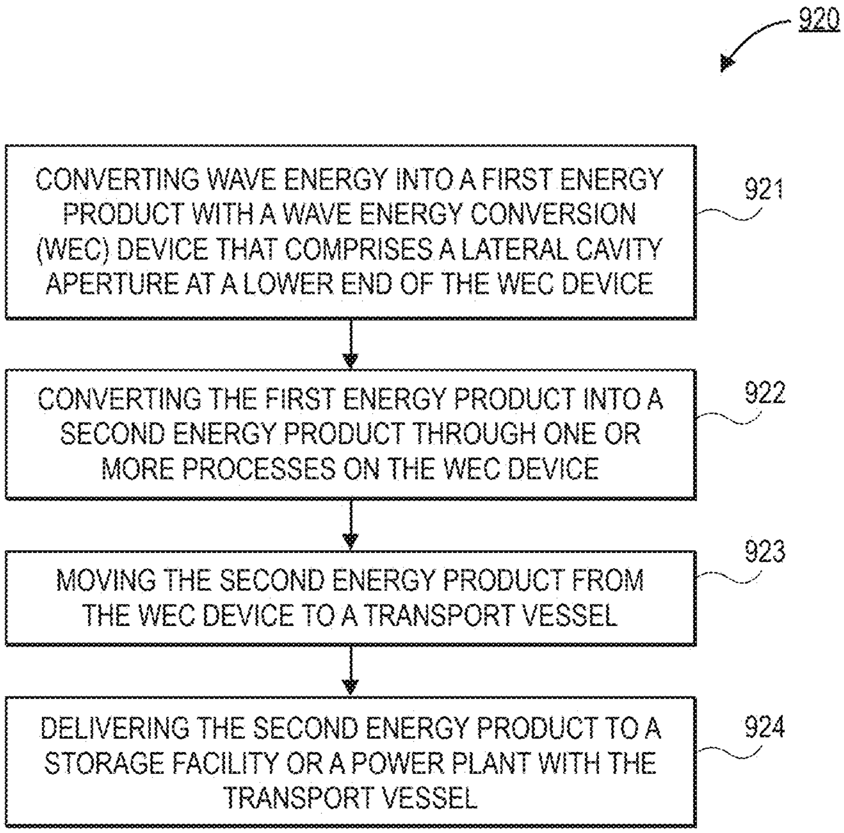
FIG. 30 is a process flow diagram of a process for energy product generation and conversion on a vessel with a cavity with a lateral aperture and transporting the converted energy product to a vessel, in accordance with an embodiment.

FIG. 30 is a process flow diagram of a process 920 for converting a first energy product into a second energy product and transporting the second energy product to a storage facility or power plant. In an embodiment, the process 920 may begin with operation 921, which comprises converting wave energy into a first energy product with a WEC that comprises a lower cavity with a lateral aperture. The WEC may be similar to any of the WECs described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the WEC can be used in order to produce the energy product.

In an embodiment, the process 920 may continue with operation 922, which comprises converting the first energy product into a second energy product through one or more processes on the WEC. The conversion of the first energy product to the second energy product may include converting one type of fuel or chemical into another fuel or chemical. In one embodiment, the first energy product may comprise hydrogen, and the second energy product may comprise methanol. Additional precursors (e.g., $CO_2$) may be reacted with the first energy product in order to generate the second energy product. For example, a process similar to the process described with respect to FIG. 24 may be used in some embodiments. Other conversion processes may also be used, such as, but not limited to, filtering, compression (e.g., from a gas to a liquid), purification, or the like may be used. Conversions may also include processing biological products. For example, algae may be processed into algae oil, or fish may be processed into fish oil. The conversion process may be implemented on or within the vicinity of the WEC. For example, a processing plant may be provided on the WEC, similar to what is shown in FIG. 31.

In an embodiment, the process 920 may continue with operation 923, which comprises moving the second energy product from the WEC to a transport vessel. The transport vessel may be similar to any vessel described herein. For example, the transport vessel may comprise a boat, a submersible, an aerial vehicle, or any other vessel that is capable of controlled motion on, through, and/or over the body of water on which the WEC floats. The second energy product may be delivered or moved (actively or passively) to the transport vessel through any mechanism, such as a hose, a pipe, a cable, or the like.

In an embodiment, the process may continue with operation 924, which comprises delivering the second energy product to a storage facility or a power plant with the transport vessel. The storage facility or a power plant may be provided at a location that is different than an approximate location of the WEC. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the second energy product from the WEC and deliver it to the second vessel. The second vessel may then take the second energy product towards shore.

Figure 31:
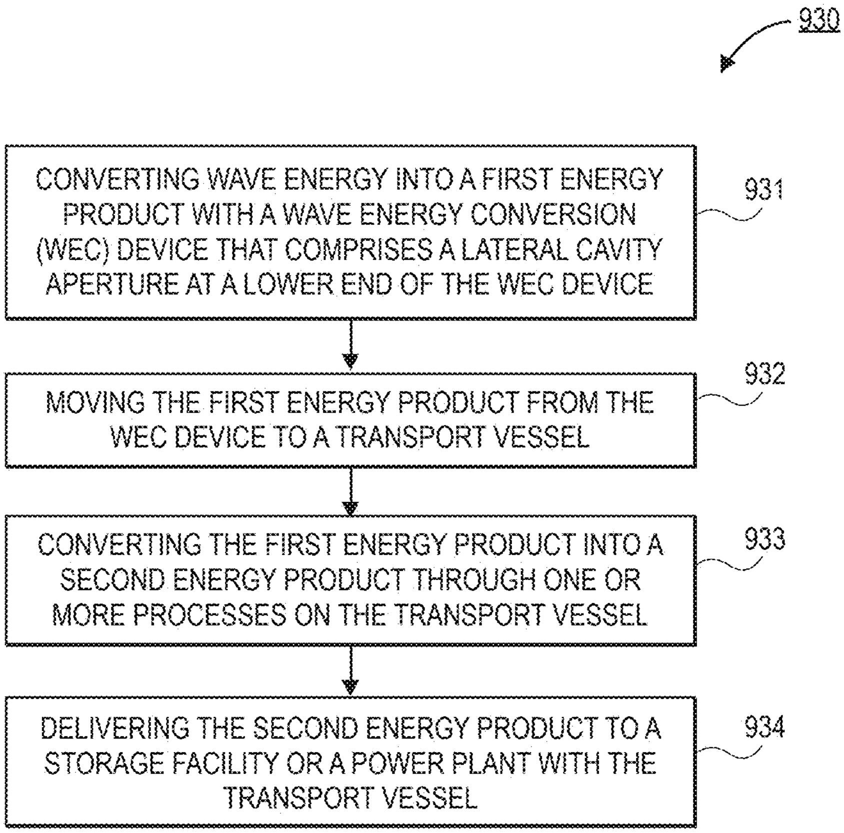
FIG. 31 is a process flow diagram of a process for generating an energy product with a vessel with a cavity with a lateral aperture and transporting the energy product to a vessel, in accordance with an embodiment.

FIG. 31 is a process flow diagram of a process 930 for converting a first energy product into a second energy product and transporting the second energy product to storage facility or power plant. In an embodiment, the process 930 may begin with operation 931, which comprises converting wave energy into a first energy product with a WEC that comprises a lower cavity with a lateral aperture. The WEC may be similar to any of the WECs described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the WEC can be used in order to produce the energy product.

In an embodiment, the process 930 may continue with operation 932, which comprises moving the first energy product from the WEC to a transport vessel. The transport vessel may be similar to any vessel described herein. For example, the transport vessel may comprise a boat, a submersible, an aerial vehicle, or any other vessel that is capable of controlled motion on, through, or over the body of water on which the WEC floats. The first energy product may be delivered or moved (actively or passively) to the transport vessel through any mechanism, such as a hose, a pipe, a cable, or the like.

In an embodiment, the process 930 may continue with operation 933, which comprises converting the first energy product into a second energy product through one or more processes on the transport vessel. The conversion of the first energy product to the second energy product may include converting one type of fuel or chemical into another fuel or chemical. In one embodiment, the first energy product may comprise hydrogen, and the second energy product may comprise methanol. Additional precursors (e.g., $CO_2$) may be reacted with the first energy product in order to generate the second energy product. For example, a process similar to the process described with respect to FIG. 24 may be used in some embodiments. Other conversion processes may also be used, such as, but not limited to, filtering, compression (e.g., from a gas to a liquid), purification, or the like may be used. Conversions may also include processing biological products. For example, algae may be processed into algae oil, or fish may be processed into fish oil. The conversion process may be implemented on or within the vicinity of the transport vessel. For example, a processing plant may be provided on the transport vessel, similar to what is shown in FIG. 32.

In an embodiment, the process 930 may continue with operation 934, which comprises delivering the second energy product to a storage facility or a power plant with the transport vessel. The storage facility or a power plant may be provided at a location that is different than an approximate location of the WEC. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the energy product from the WEC and deliver it to the second vessel. The second vessel may then take the energy product towards shore.

Figure 32:
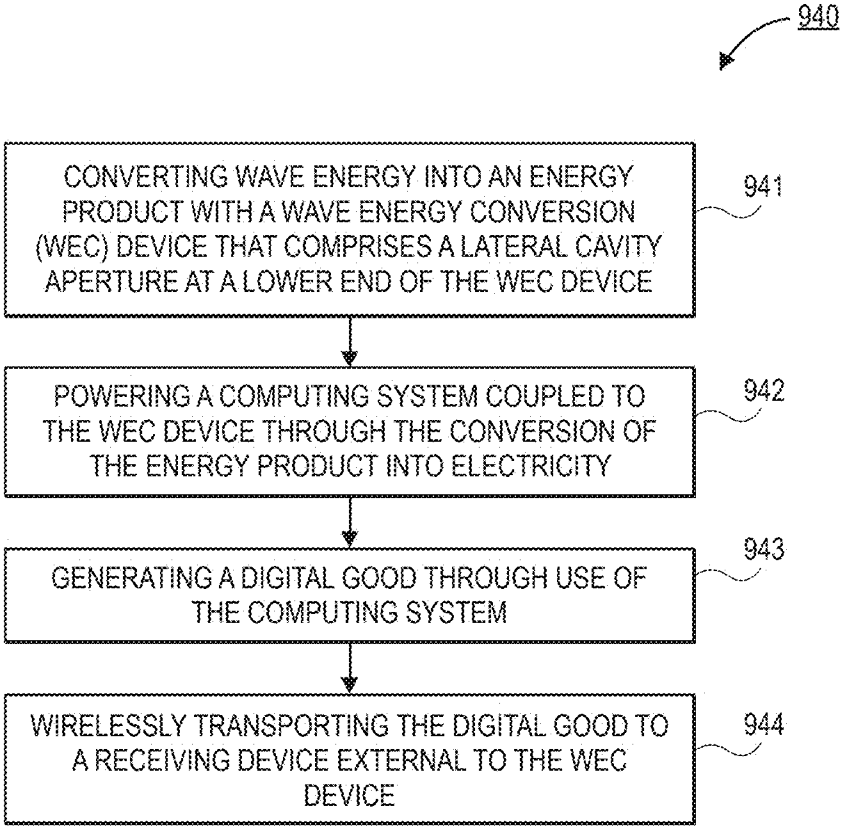
FIG. 32 is a process flow diagram of a process for generating an energy product with a vessel with a cavity with a lateral aperture, and using the energy product to produce digital goods, in accordance with an embodiment.

FIG. 32 is a process flow diagram of a process 940 for using a WEC to power a computing system (either directly or through use of an energy product) in order to generate digital goods. In an embodiment, the process 940 may begin with operation 941, which comprises converting wave energy into an energy product with a WEC that comprises a lower cavity with a lateral aperture. The WEC may be similar to any of the WECs described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the WEC can be used in order to produce the energy product.

In an embodiment, the process 940 may continue with operation 942, which comprises powering a computer system coupled to the WEC through the conversion of the energy product into electricity. For example, the energy product may be a fuel (e.g., hydrogen) that can be consumed to generate electricity. This may provide a more stable and consistent power supply than relying on the direct conversion of wave energy to electricity to power the computer system. Though, in some embodiments, the WEC may directly power the computer system without the need to generate an intervening energy product to store energy for future use.

In an embodiment, the process 940 may continue with operation 943, which may comprise generating a digital good through use of the computing system. In an embodiment, the digital good may include a block-chain based coin, a trained ML algorithm, a trained AI algorithm, a software product, a digital token, server capacity, or the like. The digital good may be stored on a non-transitory computer readable medium (e.g., a memory, a disk drive, a CD, a DVD, or other storage medium) in some embodiments.

In an embodiment, the process 940 may continue with operation 944, which comprises wirelessly transporting the digital good to a receiving device external to the WEC. The receiving device may be a second non-transitory computer readable medium provided at a location remote from the WEC. For example, the receiving device may be located on land or near land (e.g., up to 100 kilometers from land, up to 40 kilometers from land, up to 1 kilometer from land, up to 500 meters from land, or up to 50 meters from land). In an embodiment, the wireless transfer of the digital good may be transmitted through an antenna or other device for connecting to a wireless network. While wireless transport of the digital good may be faster, physical transport of the digital good stored on a non-transitory computer readable medium may also be provided by way of a vessel, a wired connection, or the like.

While the foregoing disclosure has described various embodiments, it is understood that the invention is not limited to any specific embodiment or depiction herein. A person of ordinary skill in the art would readily appreciate modifications and substitutions herein, and the scope of the invention includes all such modifications and substitutions. Accordingly, the scope of the invention should not be construed to be limiting by the foreign description except where expressly so stated, but rather the invention's scope is properly determined by the appended claims, using the common and ordinary meanings of the words therein consistent with, but not limited by, the descriptions and figures of this disclosure.

EXAMPLES

Example 1: a vessel configured to float at a surface of a body of water, comprising: a buoy that is configured to float at the surface of the body of water; a tube coupled to the buoy, wherein the tube extends down into the body of water; and a cavity at an end of the tube opposite from the buoy, wherein the cavity comprises an aperture that is at least partially along a plane that is non-orthogonal to a longitudinal axis of the tube, and wherein a bottom surface of the cavity comprises a tangent that is up to 20° from being orthogonal to the longitudinal axis of the tube.

Example 2: the vessel of Example 1 or Example 2, wherein the bottom surface of the cavity is substantially orthogonal to the longitudinal axis of the tube.

Example 3: the vessel of Examples 1-3, wherein a fluidic path is provided from the aperture of the cavity into the tube and further into the buoy.

Example 4: the vessel of Example 3, wherein a constriction is provided along the fluidic path.

Example 5: the vessel of Example 4, wherein the constriction is located within the tube.

Example 6: the vessel of Examples 1-5, wherein the plane of the aperture is substantially parallel to the longitudinal axis of the tube.

Example 7: the vessel of Examples 1-6, wherein the tube is coupled to the cavity by a constriction.

Example 8: the vessel of Example 7, wherein the constriction has a frustoconical shape.

Example 9: the vessel of Example 7 or Example 8, wherein an outer surface of the cavity is within a vertical projection of an outer circumference of the constriction.

Example 10: the vessel of Examples 1-9, wherein the cavity is rotatable so that a direction orthogonal to the plane of the aperture can rotate about the longitudinal axis of the tube.

Example 11: the vessel of Examples 1-10, wherein the cavity comprises a first shell and a second shell.

Example 12: the vessel of Example 11, wherein a lower edge of the second shell is located inside a region defined by a vertical projection of the tube.

Example 13: the vessel of Examples 1-12, wherein the cavity comprises a faceted surface.

Example 14: a vessel configured to float at a surface of a body of water, comprising: a buoy that is configured to float at the surface of the body of water; a tube coupled to the buoy, wherein the tube extends down into the body of water; and a cavity at an end of the tube opposite from the buoy, wherein the cavity comprises an aperture that is at least partially along a plane that is non-orthogonal to a longitudinal axis of the tube, and wherein a width of the aperture is greater than a narrowest outer width of the tube.

Example 15: the vessel of Example 14, wherein the plane of the aperture is substantially parallel to the longitudinal axis of the tube.

Example 16: the vessel of Example 14 or Example 15, wherein the tube is coupled to the cavity by a constriction.

Example 17: the vessel of Example 16, wherein the constriction has a frustoconical shape.

Example 18: the vessel of Example 16 or Example 17, wherein an outer surface of the cavity is within a vertical projection of an outer circumference of the constriction.

Example 19: the vessel of Examples 14-18, wherein the cavity is rotatable so that a direction orthogonal to the plane of the aperture can rotate about the longitudinal axis of the tube.

Example 20: the vessel of Examples 14-19, wherein the cavity comprises a first shell and a second shell.

Example 21: the vessel of Example 20, wherein a lower edge of the second shell is located inside a region defined by a vertical projection of the tube.

Example 22: the vessel of Examples 14-21, wherein the cavity comprises a faceted surface.

Example 23: the vessel of Examples 14-22, wherein a bottom surface of the cavity is flat.

Example 24: the vessel of Examples 14-23, wherein the cavity comprises a plurality of rings and/or ring segments and a bottom cover.

Example 25: the vessel of Example 24, wherein a first ring coupled to the tube is frustoconical and a second ring coupled to the first ring is cylindrical.

Example 26: the vessel of Examples 14-25, wherein the cavity comprises a plurality of segments that are arranged to form an offset elbow shape.

Example 27. A method of converting wave energy into a computational product, the method comprising: capturing energy from waves of a body of water with a buoyant wave energy converter, the buoyant wave energy converter comprising: a buoy that is configured to float at a surface of the body of water; a tube coupled to the buoy, wherein the tube extends down into the body of water; and a cavity at an end of the tube opposite from the buoy, wherein the cavity comprises an aperture that is at least partially along a plane that is non-orthogonal to a longitudinal axis of the tube, and wherein a bottom surface of the cavity comprises a tangent that is up to 20° from being orthogonal to the longitudinal axis of the tube; and using the captured energy to power a computing system coupled to the buoyant wave energy converter.

Example 28. The method of Example 27, wherein using the computational product comprises one or more of a digital good, a computational algorithm, a proof-of-work mechanism for a cryptocurrency generated by the computational algorithm, or a trained machine learning algorithm generated by the computational algorithm, Example 29. The method of Example 27 or Example 28, wherein the computing system is configured to implement one or more of data center hosting, implementing block chain mining, training machine learning (ML) algorithms, or training artificial intelligence (AI) algorithms.

Example 30. The method of Examples 27-29, further comprising: transmitting the computational product to a receiver that is remote from the buoyant wave energy converter.

We claim:

1. A vessel configured to float at a surface of a body of water, comprising:

a buoy that is configured to float at the surface of the body of water;

a tube coupled to the buoy, wherein the tube extends down into the body of water; and a cavity at an end of the tube opposite from the buoy, wherein the cavity comprises an aperture that is at least partially along a plane that is non-orthogonal to a longitudinal axis of the tube, and wherein a bottom surface of the cavity comprises a tangent that is up to 20° from being orthogonal to the longitudinal axis of the tube.

2. The vessel of claim 1, wherein the bottom surface of the cavity is substantially orthogonal to the longitudinal axis of the tube.

3. The vessel of claim 1, wherein a fluidic path is provided from the aperture of the cavity into the tube and further into the buoy.

4. The vessel of claim 3, wherein a constriction is provided along the fluidic path.

5. The vessel of claim 4, wherein the constriction is located within the tube.

6. The vessel of claim 1, wherein the plane of the aperture is substantially parallel to the longitudinal axis of the tube.

7. The vessel of claim 1, wherein the tube is coupled to the cavity by a constriction.

8. The vessel of claim 7, wherein the constriction has a frustoconical shape.

9. The vessel of claim 7, wherein an outer surface of the cavity is within a vertical projection of an outer circumference of the constriction.

10. The vessel of claim 1, wherein the cavity is rotatable so that a direction orthogonal to the plane of the aperture can rotate about the longitudinal axis of the tube.

11. The vessel of claim 1, wherein the cavity comprises a first shell and a second shell.

12. The vessel of claim 11, wherein a lower edge of the second shell is located inside a region defined by a vertical projection of the tube.

13. The vessel of claim 1, wherein the cavity comprises a faceted surface.

14. A vessel configured to float at a surface of a body of water, comprising:

a buoy that is configured to float at the surface of the body of water;

a tube coupled to the buoy, wherein the tube extends down into the body of water; and a cavity at an end of the tube opposite from the buoy, wherein the cavity comprises an aperture that is at least partially along a plane that is non-orthogonal to a longitudinal axis of the tube, and wherein a width of the aperture is greater than a narrowest outer width of the tube.

15. The vessel of claim 14, wherein the plane of the aperture is substantially parallel to the longitudinal axis of the tube.

16. The vessel of claim 14, wherein the tube is coupled to the cavity by a constriction.

17. The vessel of claim 16, wherein the constriction has a frustoconical shape.

18. The vessel of claim 16, wherein an outer surface of the cavity is within a vertical projection of an outer circumference of the constriction.

19. The vessel of claim 14, wherein the cavity is rotatable so that a direction orthogonal to the plane of the aperture can rotate about the longitudinal axis of the tube.

20. The vessel of claim 14, wherein the cavity comprises a first shell and a second shell.

21. The vessel of claim 20, wherein a lower edge of the second shell is located inside a region defined by a vertical projection of the tube.

22. The vessel of claim 14, wherein the cavity comprises a faceted surface.

23. The vessel of claim 14, wherein a bottom surface of the cavity is flat.

24. The vessel of claim 14, wherein the cavity comprises a plurality of rings and/or ring segments and a bottom cover.

25. The vessel of claim 24, wherein a first ring coupled to the tube is frustoconical and a second ring coupled to the first ring is cylindrical.

26. The vessel of claim 14, wherein the cavity comprises a plurality of segments that are arranged to form an offset elbow shape.

27. A method of converting wave energy into a computational product, the method comprising:

capturing energy from waves of a body of water with a buoyant wave energy converter, the buoyant wave energy converter comprising:

a buoy that is configured to float at a surface of the body of water;

a tube coupled to the buoy, wherein the tube extends down into the body of water; and a cavity at an end of the tube opposite from the buoy, wherein the cavity comprises an aperture that is at least partially along a plane that is non-orthogonal to a longitudinal axis of the tube, and wherein a bottom surface of the cavity comprises a tangent that is up to 20° from being orthogonal to the longitudinal axis of the tube; and using the captured energy to power a computing system coupled to the buoyant wave energy converter.

28. The method of claim 27, wherein using the computational product comprises one or more of a digital good, a computational algorithm, a proof-of-work mechanism for a cryptocurrency generated by the computational algorithm, or a trained machine learning algorithm generated by the computational algorithm.

29. The method of claim 27, wherein the computing system is configured to implement one or more of data center hosting, implementing block chain mining, training machine learning (ML) algorithms, or training artificial intelligence (AI) algorithms.

30. The method of claim 27, further comprising:

transmitting the computational product to a receiver that is remote from the buoyant wave energy converter.

* * * * *